US009712049B2

(12) United States Patent
Goto et al.

(10) Patent No.: US 9,712,049 B2
(45) Date of Patent: *Jul. 18, 2017

(54) POWER CONVERTER WITH NOISE-CURRENT REDUCTION CAPACITOR

(71) Applicants: DENSO CORPORATION, Kariya, Aichi-pref. (JP); NIPPON SOKEN, INC., Nishio, Aichi-pref. (JP)

(72) Inventors: Shinya Goto, Gifu (JP); Yuuki Takemoto, Kariya (JP); Katsutoyo Misawa, Kariya (JP); Tougo Yamaguchi, Aichi-ken (JP); Shinji Ohoka, Okazaki (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 145 days.

This patent is subject to a terminal disclaimer.

(21) Appl. No.: 14/186,169

(22) Filed: Feb. 21, 2014

(65) Prior Publication Data

US 2014/0233281 A1 Aug. 21, 2014

(30) Foreign Application Priority Data

Feb. 21, 2013 (JP) .................................. 2013-031653
Jan. 27, 2014 (JP) .................................. 2014-012010

(51) Int. Cl.
*H02J 1/02* (2006.01)
*H02M 1/44* (2007.01)
*H02M 7/00* (2006.01)

(52) U.S. Cl.
CPC ............. *H02M 1/44* (2013.01); *H02M 7/003* (2013.01)

(58) Field of Classification Search
CPC .......... H02M 1/44; H02M 7/003; H02M 1/14; H02M 1/143; H02M 1/146
(Continued)

(56) References Cited

U.S. PATENT DOCUMENTS

| 6,898,092 B2 * | 5/2005 | Briere ..................... H02M 1/44 363/39 |
| 7,880,577 B1 * | 2/2011 | Glaser .................. H02M 1/143 323/308 |

(Continued)

FOREIGN PATENT DOCUMENTS

| JP | 2005-110406 | 4/2005 |
| JP | 2006-180578 | 7/2006 |
| JP | 2012-135175 | 7/2012 |

*Primary Examiner* — Alex Torres-Rivera
(74) *Attorney, Agent, or Firm* — Nixon & Vanderhye P.C.

(57) ABSTRACT

In a power converter, a housing is grounded. A power converter circuit is installed in the housing and configured to perform power conversion of input power into output power. An external terminal is electrically connected to the power converter circuit for connection of an external device to the power converter circuit. A first capacitor has first and second electrodes. The first electrode of the first capacitor is connected to the external terminal, and the second electrode thereof is connected to the housing. A second capacitor has first and second electrodes. The first electrode of the second capacitor is connected to the external terminal, and the second electrode thereof is connected to the housing. The first capacitor, the external terminal, the second capacitor, and the housing is arranged to provide a conductive loop.

18 Claims, 16 Drawing Sheets

(58) Field of Classification Search
USPC .............. 363/39, 40, 44, 45, 47, 147, 46;
327/551–559; 361/816, 818
See application file for complete search history.

(56) References Cited

U.S. PATENT DOCUMENTS

| | | |
|---|---|---|
| 2004/0264220 A1 | 12/2004 | Briere et al. |
| 2005/0083665 A1 | 4/2005 | Nakashima et al. |
| 2006/0221655 A1* | 10/2006 | Nakahori ............... H02M 1/14 363/47 |
| 2009/0195303 A1* | 8/2009 | Bowhers ............... H02M 7/48 327/551 |
| 2011/0310585 A1* | 12/2011 | Suwa ............... H05K 7/20927 361/820 |
| 2012/0119723 A1* | 5/2012 | Mizutani ............... H02M 3/158 323/311 |
| 2012/0161900 A1 | 6/2012 | Sakoda et al. |
| 2013/0021771 A1* | 1/2013 | Goto ............... H05K 9/0037 361/816 |
| 2013/0100634 A1* | 4/2013 | Okubo ............... H01F 27/36 361/816 |
| 2014/0286070 A1* | 9/2014 | Shin ............... H02M 1/44 363/131 |

* cited by examiner

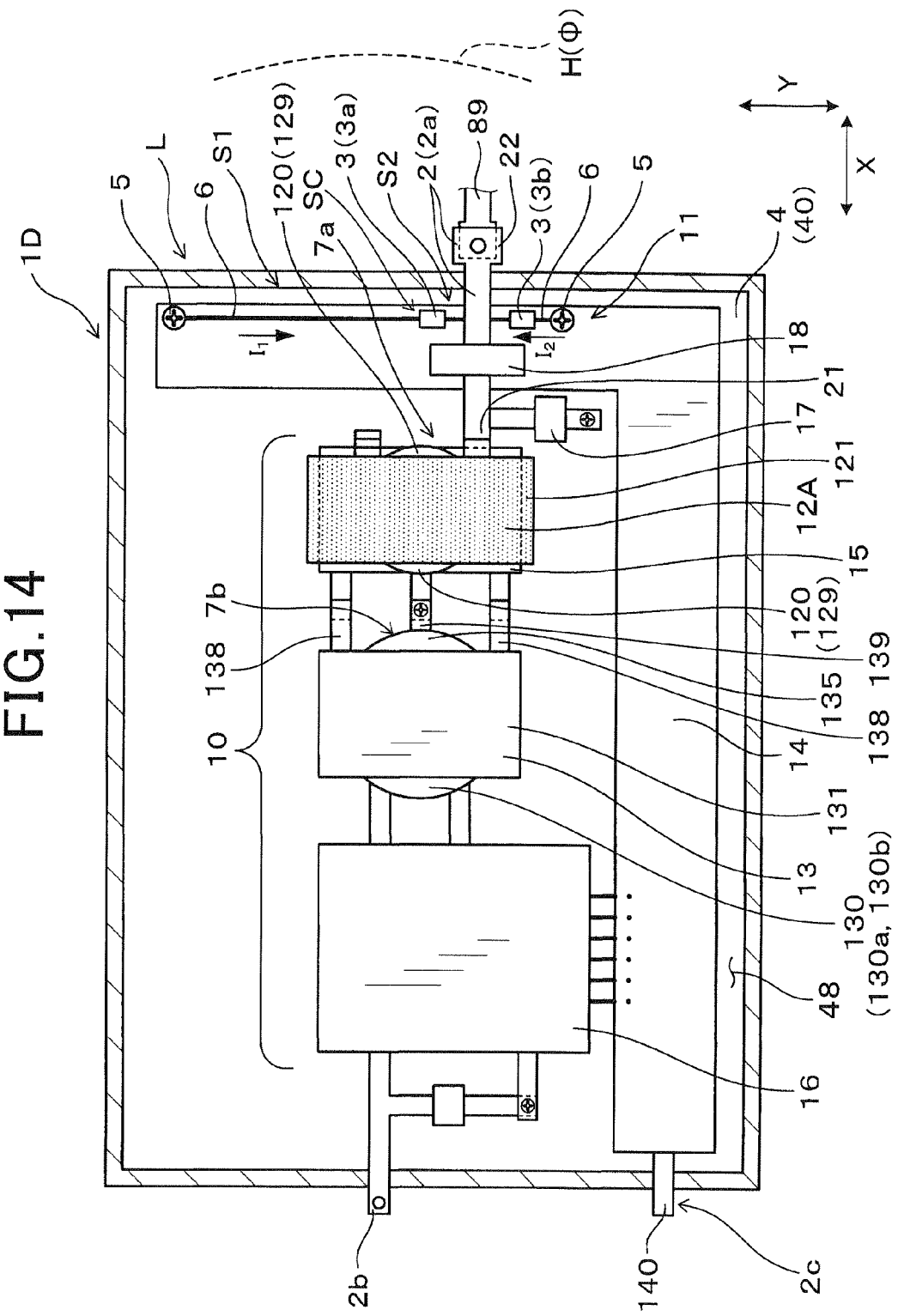

US 9,712,049 B2

POWER CONVERTER WITH NOISE-CURRENT REDUCTION CAPACITOR

CROSS REFERENCE TO RELATED APPLICATIONS

This application is based on and claims the benefit of priority from Japanese Patent Applications 2013-031653 and 2014-012010 filed on Feb. 21, 2013 and Jan. 27, 2014, respectively, the disclosure of each of which is incorporated in its entirety herein by reference.

TECHNICAL FIELD

The present disclosure relates to power converters having a power converter circuit and two capacitors electrically connected thereto for reduction of noise currents.

BACKGROUND

There are known power converters for converting a DC voltage to an AC voltage, transforming the magnitude of the AC voltage to another magnitude, and rectifying the transformed AC voltage to generate a DC voltage, thus stepping up or down the input DC voltage. These power converters include one type of power converters equipped with a filter capacitor for removing noise, which is disclosed in Japanese Patent Application Publication No. 2012-135175. In the power converter, that is, a DC to DC converter, disclosed in the Patent Publication, the filter capacitor is electrically connected between an input terminal and/or output terminal of the DC to DC converter and a ground thereof. The filter capacitor is operative to:

transfer noise currents, which try to enter from external devices into the DC to DC converter via the input terminal, to the ground, or transfer noise currents, which try to escape from the DC to DC converter to external devices via the output terminal, to the ground.

To the filter capacitor, various electrical components, such as coils and wires, are connected.

SUMMARY

However, noise currents may result from the filter capacitor itself or the wires connected to the filter capacitor. That is, as described above, because the DC to DC converter converts an input DC voltage into an AC voltage, there are components in the DC to DC converter in which an AC current flows, resulting in an AC magnetic field around the AC current. An interlinkage of the AC magnetic field with the filter capacitor or the wires may induce noise currents, and the inductive noise currents may be transmitted via the output terminal to external devices, resulting in adverse effects on the external devices. Thus, it is desired to provide a power converter device, even if an AC magnetic field is generated in the power converter device, which makes it difficult for large-magnitude noise currents induced based on the AC magnetic field to enter the output terminal of the power converter.

In view of the circumstances set forth above, one aspect of the present disclosure seeks to provide power converters, which are capable of achieving the desire set forth above.

Specifically, an alternative aspect of the present disclosure aims to provide such power converters, each of which is capable of, even if an AC magnetic field is generated in the power converter, reducing the incorporation of large-magnitude noise currents based on the AC magnetic field into the output terminal of the power converter.

According to a first exemplary aspect of the present disclosure, there is provided a power converter. The power converter includes a housing that is grounded, a power converter circuit having a portion that generates AC magnetic field having a magnetic flux and configured to perform power conversion of input power into output power, and an external terminal electrically connected to the power converter circuit for connection of an external device to the power converter circuit. The power converter includes a first capacitor having first and second electrodes. The first electrode of the first capacitor is connected to the external terminal and the second electrode thereof is connected to the housing. The power converter includes a second capacitor having first and second electrodes. The first electrode of the second capacitor is connected to the external terminal, and the second electrode thereof is connected to the housing. The first capacitor, the external terminal, the second capacitor, and the housing are arranged to provide a conductive loop having a first region and a second region. Through the first region, the magnetic flux of the AC magnetic field penetrates to induce a first noise current flowing through the conductive loop. Through the second region, the magnetic flux of the AC magnetic field penetrates to induce a second noise current flowing through the conductive loop. The first noise current flowing through the conductive loop is opposite in direction from the second noise current flowing therethrough.

In the first exemplary aspect of the present disclosure, because the first noise current and the second noise current flow through the conductive loop in the opposite directions to each other, they cancel each other so as to be weakened. This prevents large-magnitude noise currents from entering the external terminal.

According to a second exemplary aspect of the present disclosure, there is provided a power converter. The power converter includes a housing that is grounded, a power converter circuit installed in the housing and configured to perform power conversion of input power into output power, and an external terminal electrically connected to the power converter circuit for connection of an external device to the power converter circuit. The power converter includes a first capacitor having first and second electrodes. The first electrode of the first capacitor is connected to the external terminal and the second electrode thereof is connected to the housing. The power converter includes a second capacitor having first and second electrodes. The first electrode of the second capacitor is connected to the external terminal and the second electrode thereof is connected to the housing. The first capacitor, the external terminal, the second capacitor, and the housing are arranged to provide a conductive loop.

In the second exemplary aspect of the present disclosure, even if a source for generating AC magnetic field was located close to the external terminal, it would be possible to prevent noise currents induced due to the AC magnetic field from entering the external terminal. The reasons will be described as follows.

Specifically, because the conductive loop is comprised of the external terminal, concentric-patterned magnetic flux of the AC magnetic field easily penetrates through a region formed in the conductive loop two times. Specifically, the concentric-patterned magnetic flux of the AC magnetic field penetrates a first part of the region formed in the conductive loop first, and thereafter, penetrates through a second part of the region formed in the conductive loop again. At this time, the concentric-patterned magnetic flux penetrates through the first part of the region formed in the conductive loop and through the second part of the region formed in the conductive loop in substantially opposite directions to each other. For this reason, the concentric-patterned magnetic flux penetrating through the first and second parts of the region formed in the conductive loop induces a first noise current and a second noise current flowing through the conductive loop in opposite directions to each other. This causes the first noise current and the second noise current to cancel each other, thus preventing large-magnitude noise currents from entering the external terminal.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 14 is a plan view of a power converter according to a fifth embodiment of the present disclosure;

INTRODUCTION of EMBODIMENT

As a first preferable embodiment of the first exemplary aspect of the present disclosure, the ratio of magnitude of the first noise current, referred to as I1, to that of the second noise current, referred to as I2, which is referred to as I1/I2, is set to be within, for example, the range from 0.5 to 1.5 inclusive. More preferably, the ratio is set to be within the range from 0.8 to 1.2 inclusive, which reliably reduces induced noise currents entering the external terminal to an actually acceptable level. Further preferably, the ratio is set to be within the range from 0.9 to 1.1 inclusive, and still further preferably, the ratio is set to be 1.0 or thereabout.

In the first exemplary aspect of the present disclosure, as the portion of the power converter circuit, which generates AC magnetic field having a magnetic flux, for example, an output terminal of a diode module of the power converter circuit, a choke coil of the power converter circuit, or a transformer thereof can be used.

In each of the first and second exemplary aspects of the present disclosure, as the power converter circuit, a step-down converter for stepping down a voltage of a high-voltage DC power source can be used. The stepped-down DC voltage can be used to charge a low-voltage DC power source.

In each of the first and second exemplary aspects of the present disclosure, the external terminal preferably serves as an output terminal of the power converter circuit, and the first and second capacitors preferably serve as a filter circuit for removing noise currents due to the power conversion of the power converter circuit from signals output through the output terminal.

For the output terminal of the power converter circuit, reduction of noise-current entrance is strongly desired. For this reason, in each of the first and second exemplary aspects of the present disclosure, the first and second capacitors are connected to the output terminal such that the first and second capacitors sandwich the output terminal to provide a conductive loop. This configuration permits two noise currents induced through the conductive loop to flow opposite directions to each other, thus cancelling the two noise currents with each other. Thus, each of the first and second exemplary aspects of the present disclosure is capable of meeting the strong desire.

DETAILED DESCRIPTION OF EMBODIMENT

Specific embodiments of the present disclosure will be described hereinafter with reference to the accompanying drawings.

First Embodiment

Figure 1:
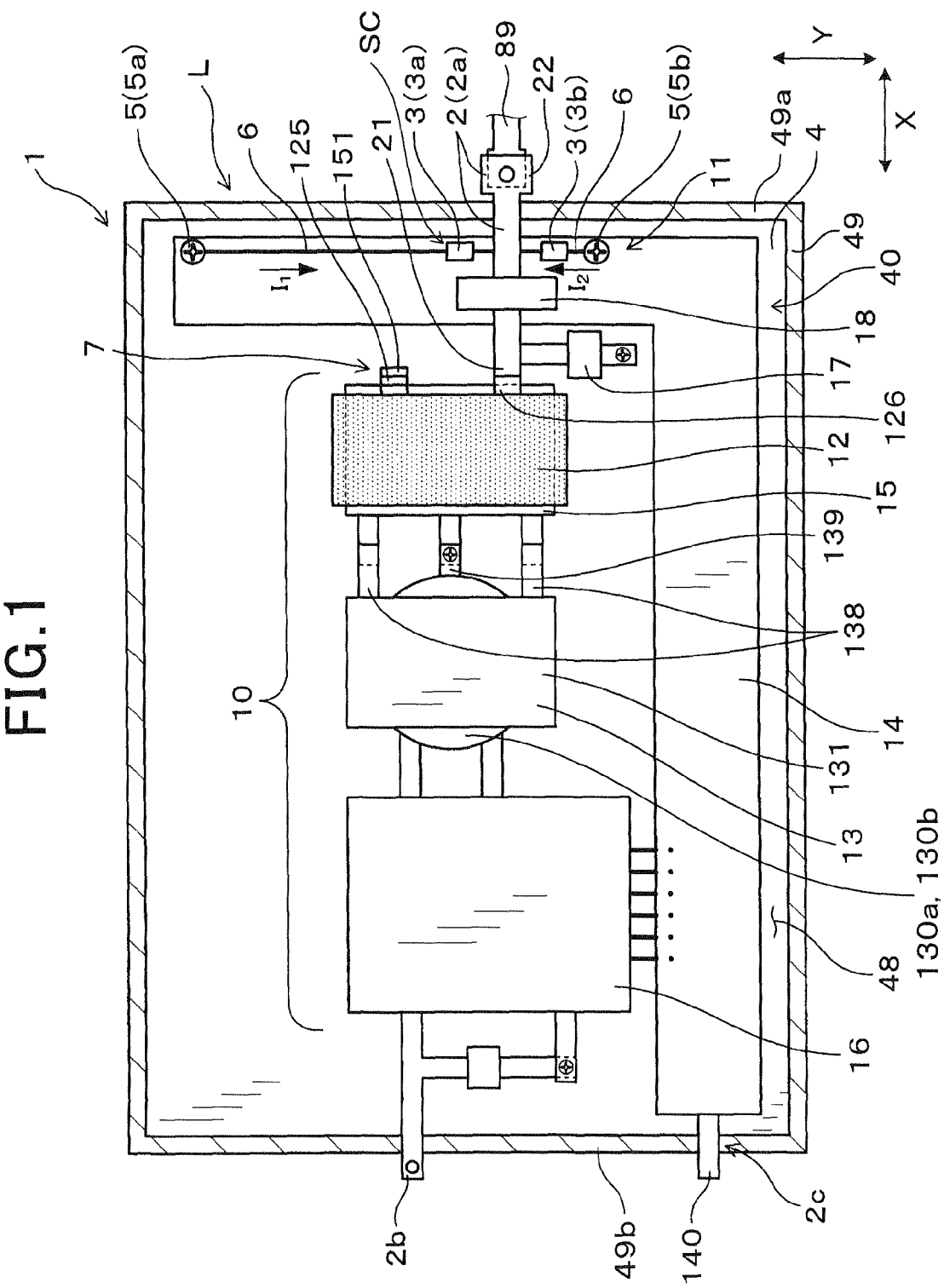
FIG. 1 is a plan view of a power converter according to a first embodiment of the present disclosure.
Figure 2:
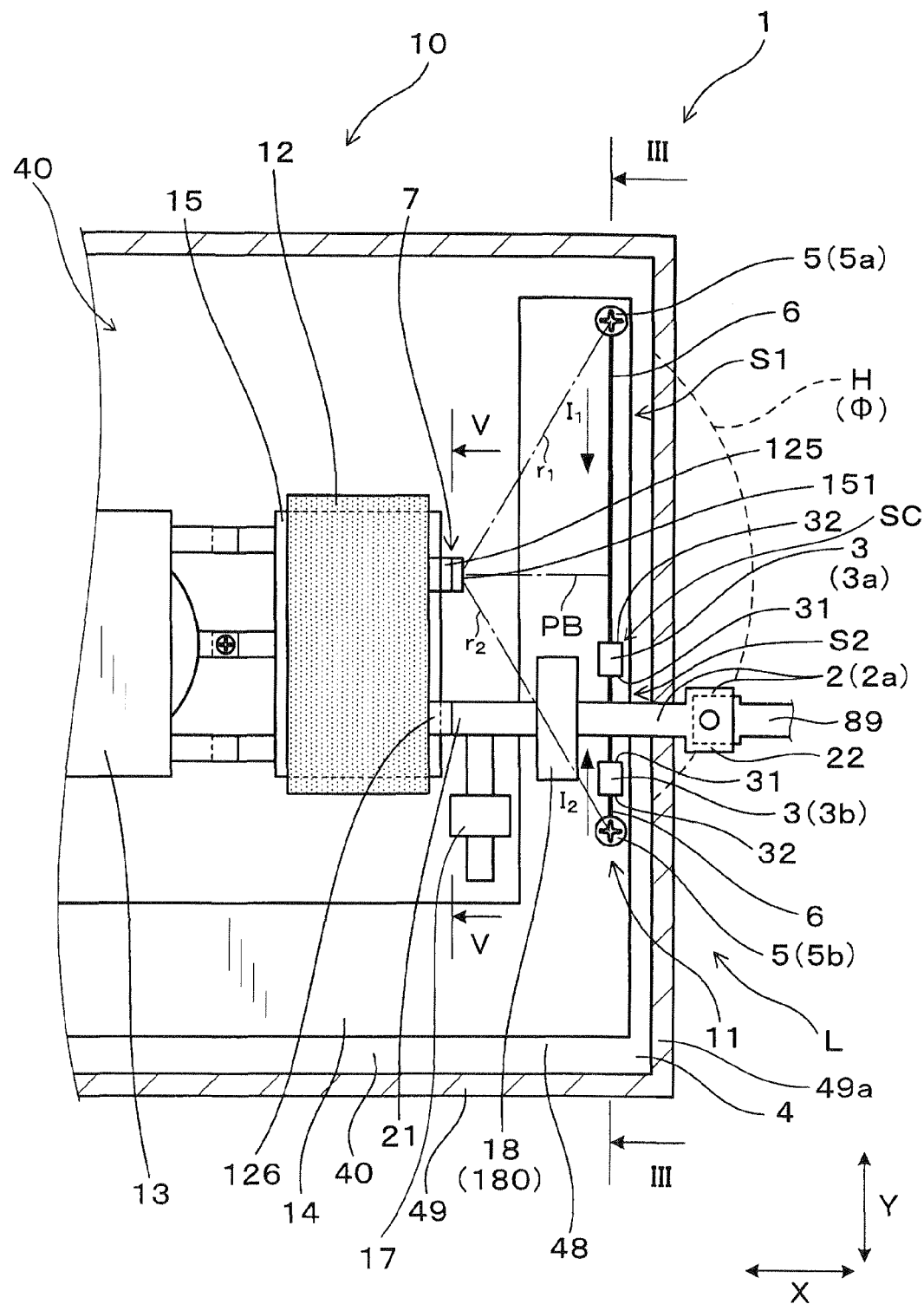
FIG. 2 is an enlarged view schematically illustrating an important part of the power converter illustrated in FIG. 1.
Figure 3:
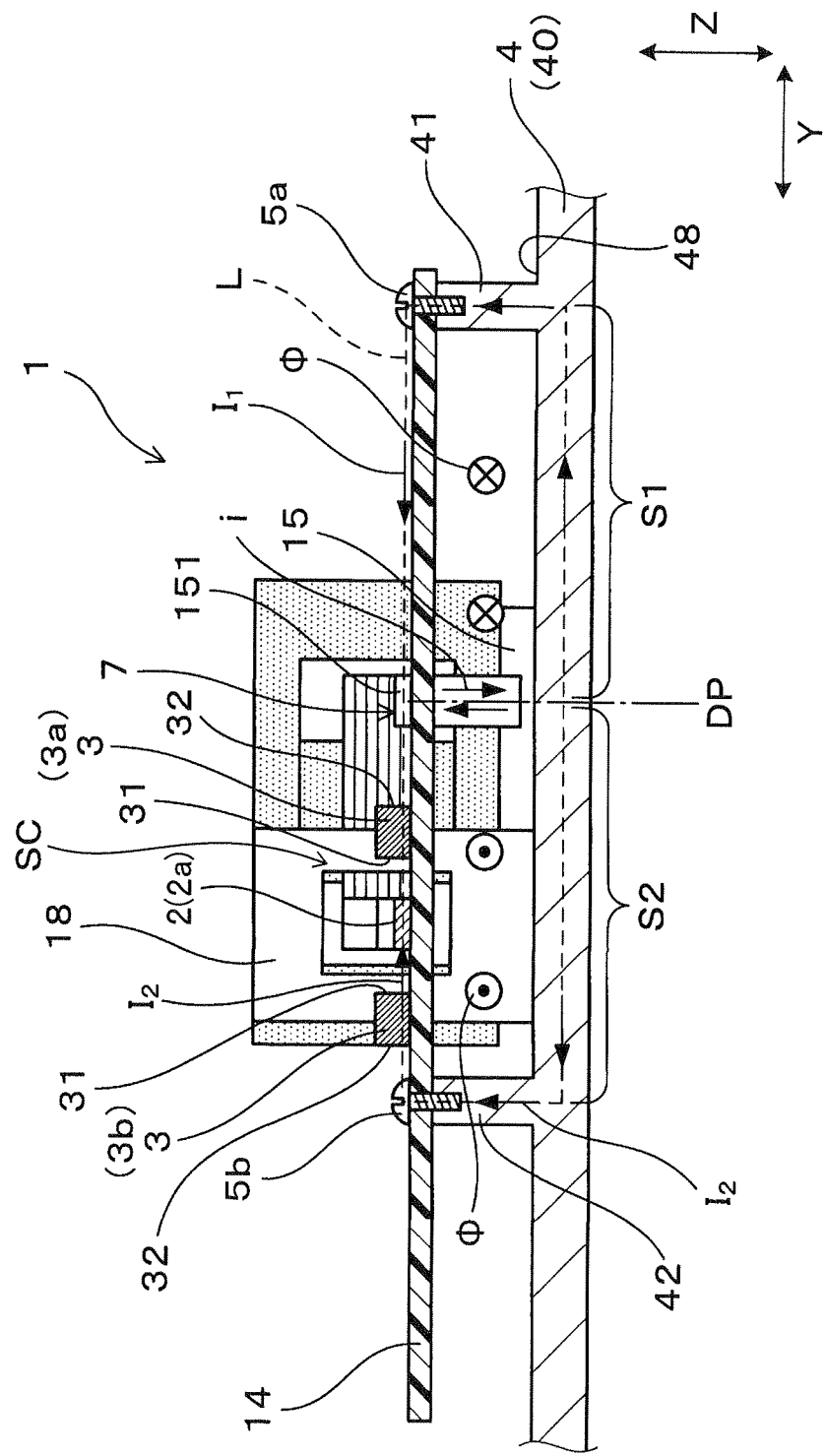
FIG. 3 is a cross sectional view taken on line III-III in FIG. 2.

Referring to FIGS. 1 to 3, a power converter 1 according to a first embodiment of the present disclosure is comprised of: a power converter circuit 10; external terminals 2 (2a, 2b, and 2c); a filter circuit 11 comprised of two capacitors 3, i.e. first and second capacitors 3a and 3b, electrically connected to the external terminal 2a; and a housing 4. The external terminals 2 permit the power converter 1 to be electrically connected to external devices. The housing casing 4 has a substantially rectangular parallelepiped body in which the power converter circuit 10 and the first and second capacitors 3a and 3b are installed. The housing 4 is made of, for example, metal, and grounded. The housing 4 has a bottom wall 40 and a sidewall assembly 49 vertically mounted on the bottom wall 40.

The external terminal 2a is located in the housing 4 such that a first end 22 thereof is, for example, penetrated vertically through a first sidewall 49a of the sidewall assembly 49 while being sealed.

In the figures, a Y direction is defined as a direction parallel to the first sidewall 49a and orthogonal to the extending direction of the external terminal 2a. An X direction is defined as a direction parallel to the extending direction of the external terminal 2a and orthogonal to the Y direction. A Z direction is defined as a direction orthogonal to both the X and Y directions, in other words, orthogonal to the bottom wall 49.

Referring to FIGS. 2 and 3, each of the first and second capacitors 3a and 3b has a rectangular plate-like shape, and has, at its first minor side, a first electrode 31 electrically connected to the external terminal 2a. Each of the first and second capacitors 3a and 3b also has, at its second minor side opposite to the first minor side, a second electrode 32 opposite to the first electrode 31; the second electrode 32 is electrically connected to the housing 4.

Referring to FIG. 3, the first and second capacitors 3a and 3b, the output terminal 2a, and the housing 4 provide a conductive loop L in which currents flow.

Figure 4:
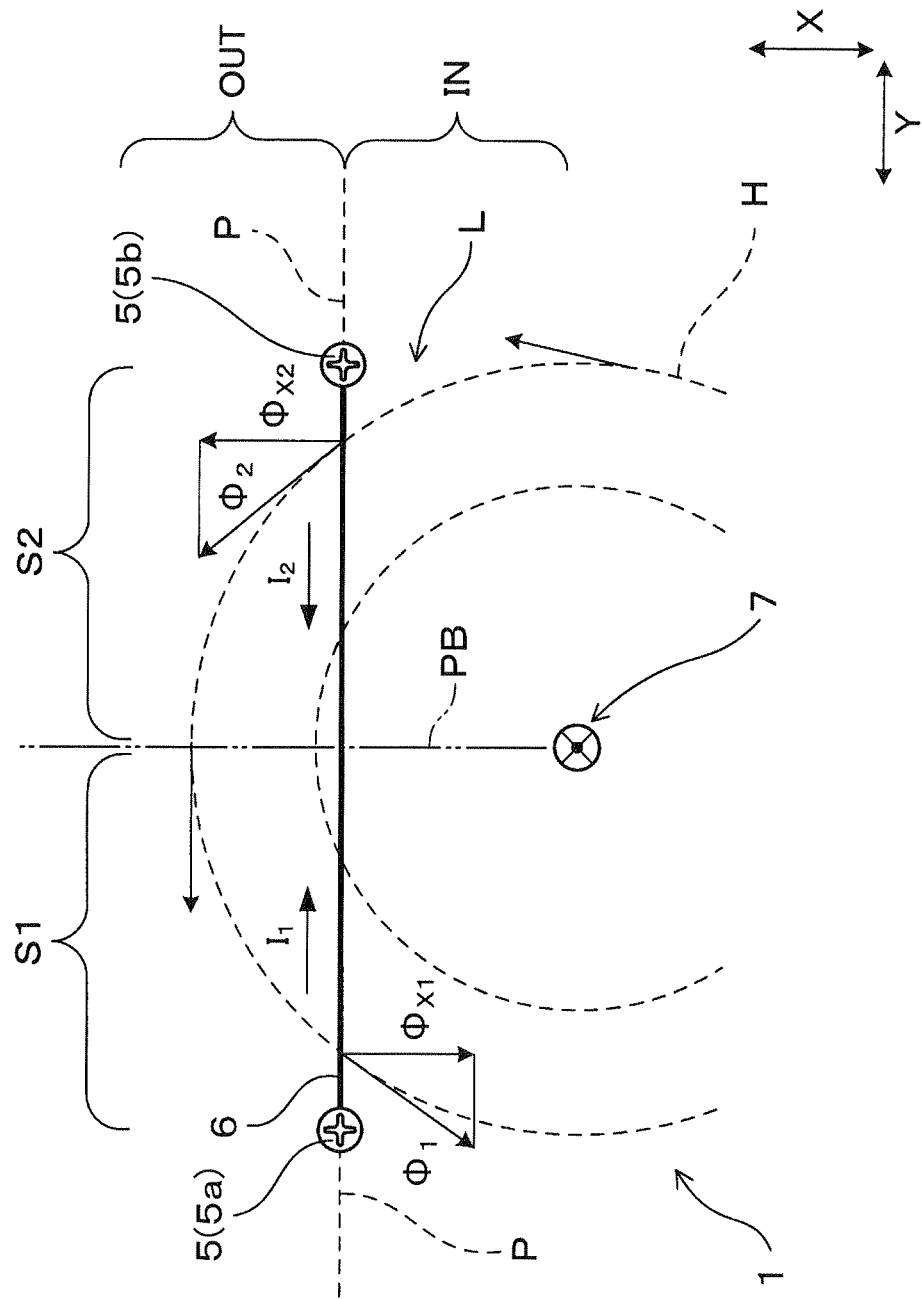
FIG. 4 is a view schematically illustrating a correlation between AC magnetic field and induced noise currents according to the first embodiment.

As illustrated in FIGS. 3 and 4, a first region S1 and a second region S2 are formed in the conductive loop L.

A magnetic flux Φ of an alternating magnetic field H is generated by a part of the power converter circuit 10, which serves as an AC magnetic-field generating portion 7. The magnetic flux Φ penetrates in the first region S1 and the second region S2.

Figure 9:
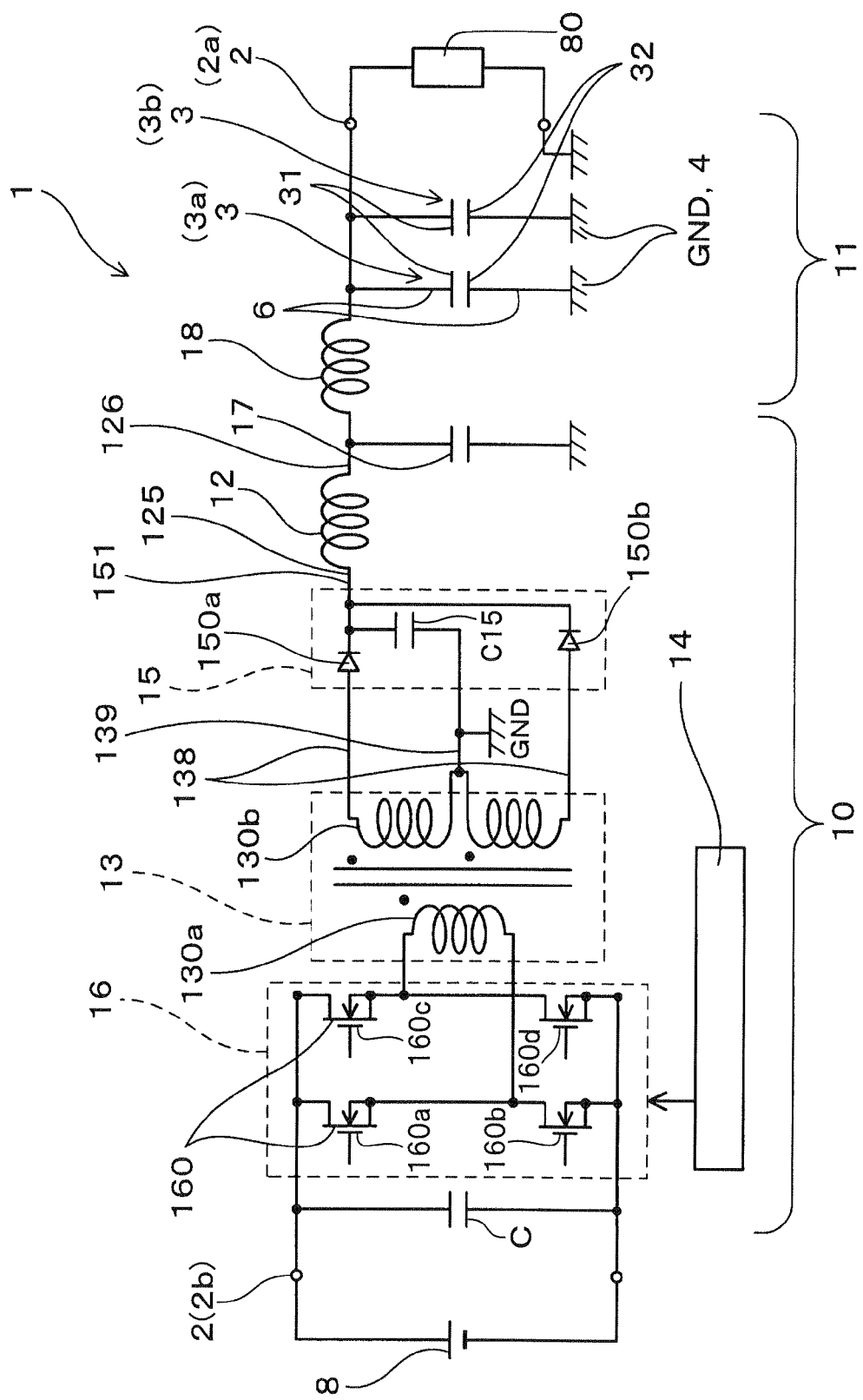
FIG. 9 is a circuit diagram schematically illustrating an example of the structure of a power converter circuit illustrated in FIG. 1.

As illustrated in FIG. 9, the power converter circuit 10 serves as a step-down converter for stepping down a DC voltage of a high-voltage DC power source 8, and for supplying the stepped-down DC voltage to a low-voltage DC power source 80, thus charging it.

Referring to FIG. 1, as described above, the external terminals 2 of the power converter 1 include the external terminal 2a, referred to as an output terminal 2a, an input terminal 2b, and signal terminals 2c. As described above, the output terminal 2a in the external terminals 2 is electrically connected to the first and second capacitors 3a and 3b to provide the conductive loop L.

As illustrated in FIGS. 1 and 2, the output terminal 2a has a second end 21 opposite to the first end 22. The second end 21 of the output terminal 2a is electrically connected to a choke coil 12; the choke coil 12, which is a part of the power converter circuit 10, is so located on an inner surface 48 of the bottom wall 40 as to face the first sidewall 49a. As described above, to the first end 22, projecting externally from the first sidewall 49a of the housing 4, an external connector 89 is electrically and mechanically connected; any external device can be electrically connected to the external connector 89.

The first and second capacitors 3a and 3b are so located in the housing casing 4 to sandwich the outer terminal 2a therebetween. The conductive loop L is arranged between the AC magnetic-field generating portion 7 and the first sidewall 49a.

In addition, the power converter 1 is comprised of a printed-circuit board installed in the housing 4. As illustrated in FIG. 1, the printed-circuit board 14 has a substantially L shape when viewed from the top side of the housing 4, which is opposite to the bottom side thereof. The printed-circuit board 14 is supported at its short-side portion on two metal columns (first and second columns) 41 and 42 projecting vertically from the inner surface 48 of the bottom wall 40 of the housing (ground) 4 such that a first surface thereof faces the inner surface 48 (see FIG. 3). Because the first and second columns 41 and 42 serve as the ground, they will be referred to as first and second ground columns 41 and 42, respectively.

The first and second ground columns 41 and 42, which are separated from each other, are located close to the first sidewall 49a, so that the short-side portion of the L-shape printed-circuit board 14 is located close to the first sidewall 49a. As illustrated in FIG. 3, a part of the output terminal 2a is mounted on a second surface of the short-side portion of the printed-circuit board 14 opposite to the first surface thereof.

Particularly, referring to FIG. 2, the first electrodes 31 of the respective first and second capacitors 3a and 3b are mounted on the second surface of the short-side portion of the printed-circuit board 14, and also electrically connected to the output terminal 2a via wires 6 formed as a pattern on the second surface of the printed-circuit board 14. The second electrodes 32 of the first and second capacitors 3a and 3b are electrically connected to the first and second ground columns 41 and 42 via wires 6 and bolts 5, i.e. first and second bolts 5a, 5b, respectively. The wires 6 extend lineally in parallel to the Y direction. Specifically, the first capacitor 3a, the output terminal 2a, and the second capacitor 3b are connected in series between the first ground column 41 and the second ground column 42 via the wires 6 to provide a capacitor series circuit SC. Thus, the capacitor series circuit SC, the first and second ground columns 41 and 42, and the housing 4 provide the conductive loop L.

The power converter 1 is further comprised of a filter coil 18 around part of the output terminal 2a; the part of the output terminal 2a is located between the second end 21 and the first sidewall 49a. For example, the filter coil 18 consists of a filter core 180 made of a soft-magnetic material, and is located to surround the part of the output terminal 2a. The filter coil 18 faces the first and second capacitors 3a and 3b; these filter coil 18 and the first and second capacitors 3a and 3b provide the filter circuit 11. The filter circuit 11 is operative to eliminate transferred noise currents generated in the power converter circuit 10 to thereby prevent the transferred noise currents from entering the output terminal 2a.

The magnetic-field generating portion 7 that generates the AC magnetic field H is located close to the filter circuit 11. In the first embodiment, the power converter circuit 10 is comprised of a diode module 15 having an output terminal 151 connected to the choke coil 12, and the output terminal 151 of the diode module 15 serves as the magnetic-field generating portion 7 to generate the AC magnetic field H.

Figure 6:
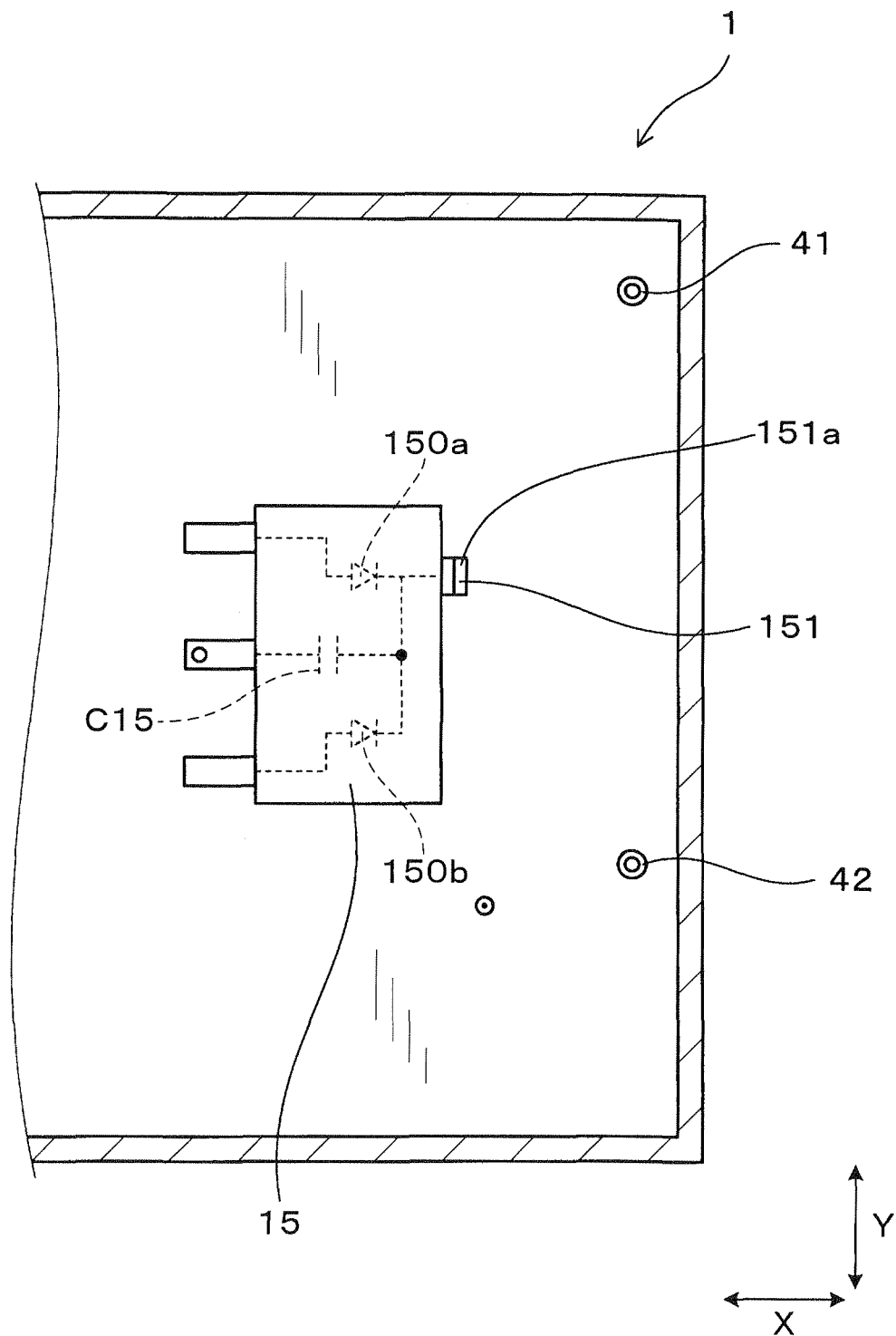
FIG. 6 is a plan view schematically illustrating a hosing and a diode module illustrated in FIG. 1.
Figure 7:
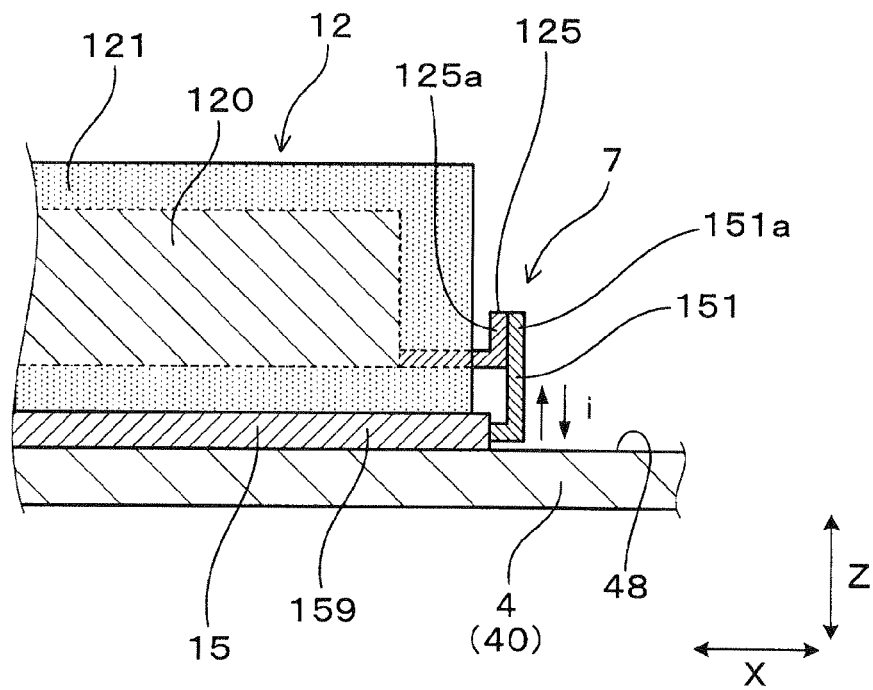
FIG. 7 is a cross sectional view taken on line VII-VII in FIG. 5.

As illustrated in FIG. 3, the diode module 15 is mounted on the inner surface 48 of the bottom wall 49 of the housing 4. As illustrated in FIGS. 6 and 7, the choke coil 12 is mounted on the diode module 15. The output terminal 151 projects from one end of the diode module 15, which faces the first sidewall 49a, in the X direction, and is bent to extend upwardly in the Z direction up to a height close to the printed-circuit board 14 (see FIGS. 6 and 7). Because the output terminal 151 extends in the normal direction of the inner surface 48 of the bottom wall 49, i.e. in the Z direction orthogonal thereto, an alternating current i output from the diode module 15 via the output terminal 151 flows in the normal direction of the inner surface of the bottom wall 49. This causes the AC magnetic field H induced by the alternating current i to have the magnetic flux Φ in the form of cylindrical shapes, in other words, concentric patterns around the alternating current i as its center axis (see FIGS. 2 and 3).

The concentric-patterned magnetic flux Φ of the AC magnetic field H penetrates the first and second regions S1 and S2 of the conductive loop L (see FIGS. 2 and 3). As illustrated in FIG. 3, a phantom plane DP is defined to pass through the half of a line connecting between the head of the first bolt 5a and that of the second bolt 5b and is orthogonal to the line. Thus, the region formed inside the conductive loop L is divided by the plane DP into the first region S1 and the second region S2. The first region S1 is formed by the plane DP, the first ground column 41, the first bolt 5a, the wire 6 connecting the plane DP and the first ground column 41, and a part of the housing 4 connecting the plane DP and the first ground column 41. The second region S2 is formed by the plane DP, the second ground column 42, the second bolt 5b, the wire 6 connecting the plane DP and the second ground column 42, and a part of the housing 4 connecting the plane DP and the second column 42.

Specifically, as illustrated in FIGS. 3 and 4, the concentric-patterned magnetic flux Φ of the AC magnetic field H penetrates, from a near side IN of the conductive loop L close to the magnetic-field generating portion 7, through the second region S2 of the conductive loop L toward a far side OUT of the conductive loop L far from the magnetic-field generating portion 7 (see the reference character of circled dot in FIG. 3).

In addition, as illustrated in FIGS. 3 and 4, the concentric-patterned magnetic flux Φ of the AC magnetic field H penetrates, from the far side OUT of the conductive loop L, through the first region S1 of the conductive loop L toward the near side IN of the conductive loop L (see the reference character of circled cross, that is, ⊗ in FIG. 3).

For example, at the moment illustrated in FIG. 4, an X-direction component Φx1 of a first part Φ1 of the concentric-patterned magnetic flux Φ, which is penetrating through the first region S1, is directed from the far side OUT to the near side IN. This induces a first inductive noise current I1 flowing through the first ground column 41 of the first region S1 in the Z direction from the ground (housing 4) to the head of the first bolt 5a. The first inductive noise current I1 flows through the capacitor series circuit SC in the direction from the first ground column 41 toward the second ground column 42 (see FIG. 3) to prevent the change of the X-direction component Φx1 of the first-part magnetic flux Φ1 from the far side OUT to the near side IN.

Similarly, at the moment illustrated in FIG. 4, an X-direction component Φx2 of a second part Φ2 of the concentric-patterned magnetic flux Φ, which is penetrating through the second region S2, is directed from the near side IN to the far side OUT. This induces a second inductive noise current I2 flowing through the second column 42 in the Z direction from the ground (housing 4) to the head of the second bolt 5b. The second inductive noise current I2 flows through the capacitor series circuit SC from the second ground column 42 toward the first ground column 41 to prevent the change of the X-direction component Φx2 of the second-part magnetic flux Φ2 from the near side IN to the far side OUT.

This results in the first inductive noise current I1 and the second inductive noise current I2 flowing in opposite directions to each other in the conductive loop L. Although the AC magnetic field H alternately changes in direction, the X-direction component Φx1 of the first-part magnetic flux Φ1 and the X-direction component Φx2 of the second-part magnetic flux Φ2 are kept to be oriented in the opposite directions to each other. This causes the first and second inductive noise currents I1 and I2 to flow through the conductive loop L in the opposite direction from each other, resulting in cancellation of the first and second inductive noise currents I1 and I2 from each other.

In the first embodiment, the wires 6 linearly extend in the Y direction orthogonal to the X and Z directions. In addition, in the first embodiment, the magnetic-field generating portion 7, i.e. the output terminal 151 of the diode module 15, the head of the first bolt 5a, and the head of the second bolt 5b are arranged such that:

a minimum distance r1 between the magnetic-field generating portion 7 and the first bolt 5a in parallel to the inner surface 48 is substantially equal to a minimum distance r2 between the magnetic-field generating portion 7 and the second bolt 5b in parallel to the inner surface 48 (see two-dot chain lines r1 and r2). In other words, when a line connecting between the head of the first bolt 5a and that of the second bolt 5b in parallel to the Y direction is defined, the magnetic-field generating potion 7 is located on a perpendicular bisector PB of the line. That is, the phantom plane DP contains therein the perpendicular bisector PB.

This arrangement causes the quantity of the magnetic flux Φ passing through the first region S1, i.e. the number of field lines thereof passing through the first region S1, to be equal to the quantity of the magnetic flux Φ passing through the second region S2, i.e. the number of field lines thereof passing through the second region S2. This results in the magnitude of the first inductive noise current I1 being substantially equal to that of the second inductive noise current I2.

Referring to FIGS. 1 and 9, the power converter circuit 10 according to the first embodiment is comprised of a MOS module 16, a transformer 13, the diode module 15, the choke coil 12, a smoothing capacitor 17, and the printed-circuit board 14. The printed-circuit board 14 serves as a control circuit for controlling the MOS module 16. The MOS module 16 is connected via a capacitor C to the input terminal 2b, and the input terminal 2b is connected to the high-voltage DC power source 8.

Specifically, as illustrated in FIG. 9, the MOS module 16 is comprised of a first pair of series-connected MOSFETs 160a and 160b, and a second pair of series-connected MOSFETs 160c and 160d, which are configured as an H bridge circuit. One end of the series-connected MOSFETs 160a and 160b is connected to a positive terminal of the high-voltage DC power source 8, and the other end of the series-connected MOSFETs 160a and 160b is connected to a negative terminal of the high-voltage DC power source 8. Similarly, one end of the series-connected MOSFETs 160c and 160d is connected to the positive terminal of the high-voltage DC power source 8, and the other end of the series-connected MOSFETs 160c and 160d is connected to the negative terminal of the high-voltage DC power source 8.

Each of the MOSFETs 160a to 160d has a control terminal connected to the printed-circuit board 14, that is, the control circuit.

In the first embodiment, the control circuit 14 is designed to complementarily turn on the high- and low-side MOSFETs 160a and 160b with high frequency. Similarly, the control circuit 14 is designed to complementarily turn on the high- and low-side MOSFETs 160c and 160d with high frequency. In addition, the control circuit 14 is designed to alternately turn on a first set of high- and low-side MOSFETs 160a and 160d and a second set of high- and low-side MOSFETs 160c and 160b. These operations of the control circuit 14 permit the MOS module 16 to serve as an inverter that converts a DC voltage input to the MOS module 16 from the high-voltage DC power source 8 into an AC voltage, and applies the AC voltage to the transformer 13.

The transformer 13 is comprised of a primary winding 130a and a secondary winding 130b having a center tap 139 and magnetically coupled to the primary winding 130a. A connecting point between the MOSFET 160a and the MOS- FET 160b is connected to one end of the primary winding 130a. A connecting point between the MOSFET 160c and the MOSFET 160d is connected to the other end of the primary winding 130a.

The secondary winding 130b has a first end and a second end opposite thereto. A first output terminal, i.e. a first end, 138 and a second output terminal, i.e. a second end, 138 of the secondary winding 130b are connected to the diode module 15. The center tap 139 of the secondary winding 130b is connected to the housing 4 so as to be grounded.

The diode module 15 is comprised of a first diode 150a, a second diode 150b, and a capacitor C15. The first output terminal 138 of the secondary winding 130b is connected to the anode of the first diode 150a, and the second output terminal 138 of the secondary winding 130b is connected to the anode of the second diode 150b.

The center tap 139 divides the secondary winding 130b into a first winding portion and a second winding portion. The turns ratio representing the number of turns of each of the first and second winding portions of the secondary winding 130b to the number of turns of the primary winding L1 is set to a predetermined value.

The transformer 13 is operative to convert the AC voltage applied to the primary winding 130a, in other words, induced through the primary winding 130a, into a different AC voltage induced in the secondary winding 130b while the primary winding 130a is electrically isolated from the secondary winding 130b; the magnitude of the AC voltage induced across the secondary winding 130b is determined based on the turns ratio.

The cathode of the first diode 150a and that of the second diode 150b are commonly connected to an input terminal 125 of the choke coil 12. The capacitor C15 is connected between the cathode of the first diode 150a and the center tap 139. An output terminal 126 of the choke coil 12 is connected to one end of the smoothing capacitor 17 and one end of the filter coil 18. The other end of the smoothing capacitor 17 is connected to the ground (housing 4).

Specifically, the first and second diodes 150a and 150b constitute a full-wave rectifier that full-wave rectifies the AC voltage induced across the secondary winding 130b, thus generating a DC voltage. The choke coil 12 and the smoothing capacitor 170 constitute an LC filter configured to smooth the DC voltage rectified by the full-wave rectifier, thus generating a smoothed DC voltage to be input to the filter circuit 11. Note that the capacitor C15 is operative to bypass noise to the ground (housing 4).

As described above, the filter circuit 11 according to the first embodiment is comprised of the filter coil 18 and the first and second capacitors 3a and 3b. Specifically, the other end of the filter coil 18 is connected to one end of the first capacitor 3a and one end of the second capacitor 3b, the other end of each of the first and second capacitors 3a and 3b is connected to the ground (housing 4). Thus, the smoothed DC voltage output from the smoothing capacitor 17 passes through the filter circuit 11 while being filtered. As described above, the output terminal 2a is connected to the first and second capacitors 3a and 3b, so that the filtered DC voltage is output from the output terminal 2a to be charged into the low-voltage DC power source 80.

Specifically, as described above, because the control circuit 14 is designed to successively turn on or off the MOSFETs 160a to 160d with high frequency, switching-noise currents are generated in the power converter circuit 10. Thus, the filter circuit 11 is operative to remove the switching-noise currents from the smoothed DC voltage output from the smoothing capacitor 17, thus preventing the switching-noise currents from being output from the output terminal 2a.

Figure 5:
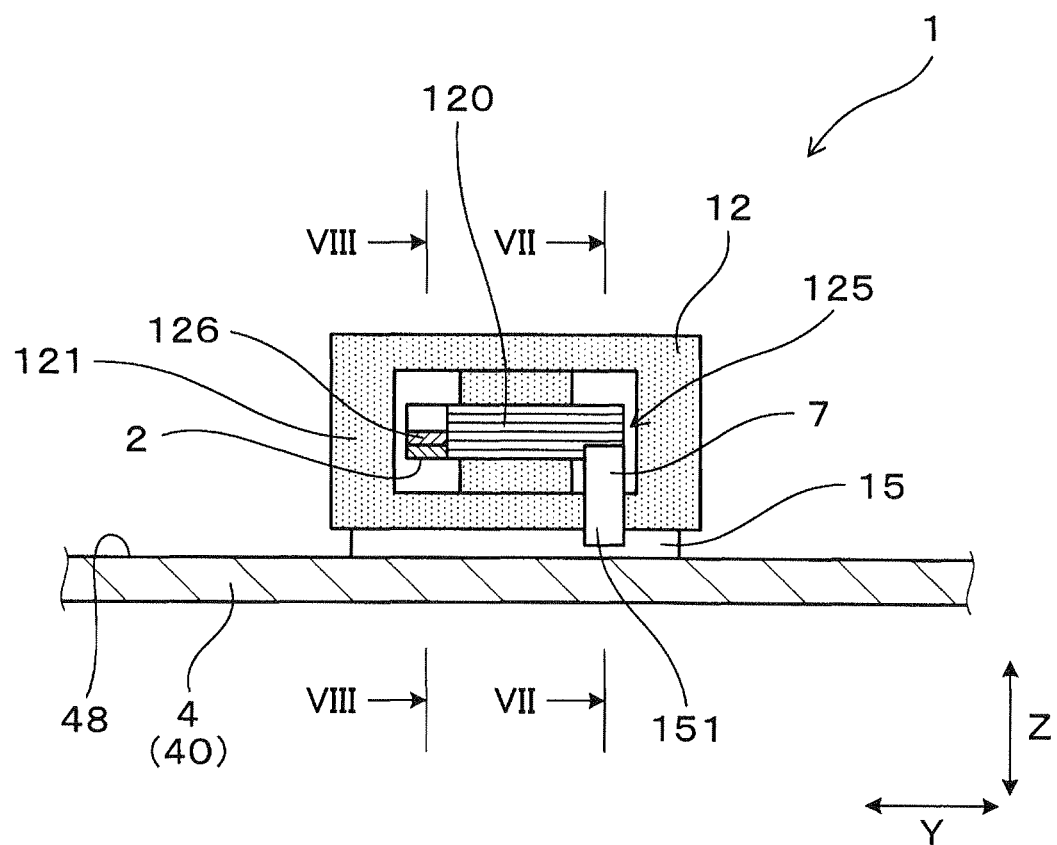
FIG. 5 is a cross sectional view taken on line V-V in FIG. 2.

Referring to FIGS. 5 and 7, the diode module 15 is mounted on the inner surface 48 of the bottom wall 49 of the housing 4, and the choke coil 12 is mounted on the diode module 15. As illustrated in FIG. 7, the input terminal 125 of the choke coil 12, which is located to face the output terminal 151 of the diode module 15, projects in the X direction to the output terminal 151, and is bent to extend upwardly in the Z direction up to a height close to the tip 151a of the output terminal 151. That is, the tip 125a of the input terminal 125 and the tip 151a of the output terminal 151 are laminated on each other in the X direction, and they are fixedly joined to each other using, for example, welding. This permits the DC voltage rectified by the diode module 15 to be input to the choke coil 12 via the joint portion of the output terminal 151 of the diode module 15 and the input terminal 125 of the choke coil 12.

Figure 8:
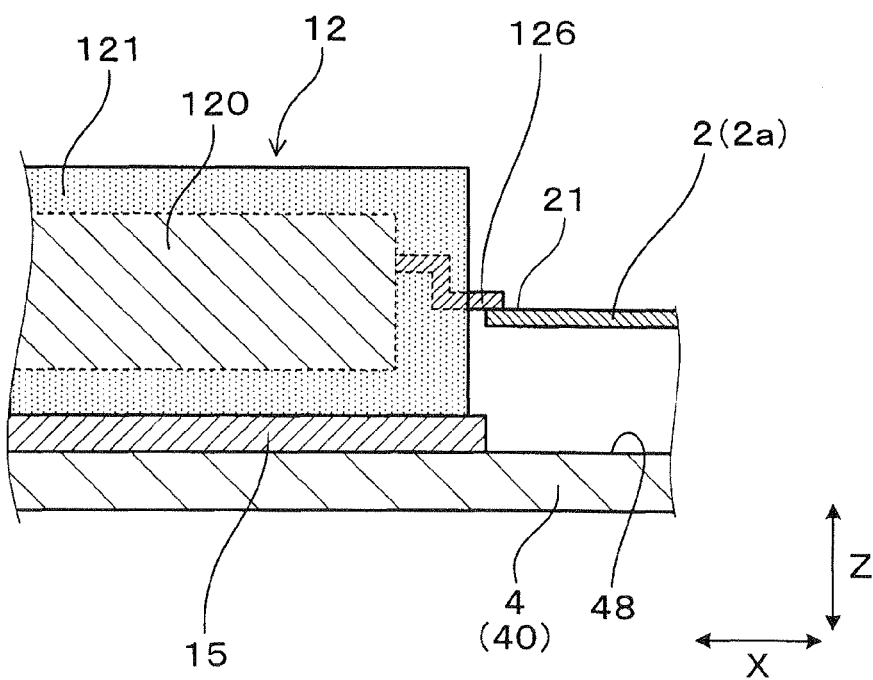
FIG. 8 is a cross sectional view taken on line VIII-VIII in FIG. 5.

In addition, as illustrated in FIGS. 5 and 8, the output terminal 126 of the choke coil 12 extends in the X direction toward the output terminal 2a so that the tip of the output terminal 126 is laminated on the second end 21 of the output terminal 2a. The tip of the output terminal 126 of the choke coil 12 is fixedly joined to the second end 21 of the output terminal 2a by, for example, welding. As illustrated in FIG. 1, one end of the smoothing capacitor 17 is connected to the second end of the output terminal 2a between the choke coil 12 and the filter coil 18, and the other end of the smoothing capacitor 17 is connected to the ground (housing 4). This permits the DC voltage smoothed by the choke coil 12 and the smoothing capacitor 17 to be input to the filter circuit 11 via the joint portion of the output terminal 126 of the choke coil 12 and the second end 21 of the output terminal 2a.

Additionally, the input terminal 2b connected to the MOS module 16 is located in the housing 4 such that it is penetrated vertically through a second sidewall 49b of the sidewall assembly 49; the second side wall 49b is opposite to the first sidewall 49a. Similarly, the printed-circuit board 14 has a connector 140 projecting from one end portion thereof facing the second sidewall 49b. The connector 140 including the signal terminals 2c is penetrated through the second sidewall 49b in parallel to the input terminal 2b. To the connector 140, any external devices, such as a host controller, can be communicably connected for inputting various instructions to the printed-circuit board 14 for controlling, for example, on-off operations of the MOSFETs 160a to 160d (see FIG. 9).

Next, how the power converter 1 according to the first embodiment works in view of addressing inductive noise currents will be described hereinafter.

As illustrated in FIGS. 2 and 3, the power converter 1 according to the first embodiment is configured such that the capacitor series circuit SC and the housing 4 for supporting the capacitor series circuit SC to provide the conductive loop L in which currents flow.

The power converter 1 is also configured such that the magnetic-field generating portion 7 is located to face the conductive loop L and configured to generate the AC magnetic field H whose concentric-patterned magnetic flux Φ penetrates through the first region S1 and the second section S2 in the conductive loop L. The conductive loop L is divided by the plane DP passing through the half of the line connecting between the head of the first bolt 5a and that of the second bolt 5b into the first and second regions S1 and S2.

The power converter 1 is further configured such that:

the first part Φ1 of the concentric-patterned magnetic flux Φ penetrating through the first region S1 induces the first inductive noise current I1 flowing through the capacitor series circuit SC; and the second part Φ2 of the concentric-patterned magnetic flux Φ penetrating through the second region S2 induces the second inductive noise current I2 flowing through the capacitor series circuit SC opposite in direction to the first inductive noise current I1.

This configuration of the power converter 1 causes the first inductive noise current I1 and the second inductive noise current I2 to cancel each other, resulting in the first and second inductive noise currents I1 and I2 being weakened. This makes it possible to prevent inductive noise currents with high levels from entering the output terminal 2a.

In the power converter 1 according to the first embodiment, the conductive loop L is comprised of the output terminal 2a itself. In order to describe a technical effect of this configuration, let us consider the AC magnetic-field generating portion 7 located close to the output terminal 2a. In this case, as illustrated in FIG. 1, the AC magnetic-field generating portion 7 is located close to the conductive loop L. Thus, this configuration causes the concentric-patterned magnetic flux Φ generated by the AC magnetic-field generating portion 7 to easily penetrate through the whole area formed inside the conductive loop L at two times. Specifically, this configuration causes the concentric-patterned magnetic flux Φ generated by the AC magnetic-field generating portion 7 to penetrate through the first region S1 in the conductive loop L first, and thereafter to easily penetrate through the second region S2 in the conductive loop L again.

As a result, as described above, the first part Φ1 of the concentric-patterned magnetic flux Φ penetrates through the first region S1 induces the first inductive noise current I1 flowing through the capacitor series circuit SC, and the second part Φ2 of the concentric-patterned magnetic flux Φ penetrates through the second region S2 induces the second inductive noise current I2 flowing through the capacitor series circuit SC opposite in direction to the first inductive noise current I1. This results in the first and second inductive noise currents I1 and I2 being weakened, making it possible to prevent inductive noise currents with high levels from entering the output terminal 2a.

The output terminal 2a serves as an output terminal of the power converter circuit 10 for outputting the DC voltage to external devices. Thus, there is a strong need for preventing noise currents from entering it. In addition, the first and second capacitors 3a and 3b serve as the filter circuit 11 for removing switching-noise currents generated in the power converter circuit 10 from the DC voltage as an output of the power converter circuit 10.

In view of the circumstances, the power converter 1 according to the first embodiment is configured such that the capacitor series circuit SC, which is comprised of the first capacitor 3a, the output terminal 2a, and the second capacitor 3b connected in series via the wires 6, and the housing 4 serving as the ground for supporting the capacitor series circuit SC to provide the conductive loop L. With this configuration, the first and second inductive noise currents I1 and I2 flow through the output terminal 2a of the conductive loop L in the opposite directions to each other, so that the first and second noise currents I1 and I2 are cancelled with each other. Thus, the configuration of the power converter 1 fulfills such a strong need for preventing noise currents from entering the output terminal 2a.

Referring to FIG. 3, the power converter 1 according to the first embodiment is configured such that the output terminal 151 extends in the normal direction of the inner surface of the bottom wall 40 of the housing 4. The power converter 1 is also configured such that the first and second ground columns 41 and 42 projecting vertically from the inner surface 48 of the bottom wall 40 of the housing 4 support the capacitor series circuit SC with a space between the capacitor series circuit SC and the bottom wall 40, providing the conductive loop L.

This configuration permits the concentric-patterned magnetic flux Φ to easily generate the first noise current I1 to flow through the first ground column 41 and the second noise current I2 to flow through the second ground column 42 in the respective opposite directions to each other. Specifically, as illustrated in FIG. 4, with this configuration, a plane P including therein the conductive loop L faces and is in parallel to the magnetic-field generating portion 7, i.e. the output terminal 151. Thus, the concentric-patterned magnetic flux Φ of the AC magnetic field H around the magnetic-field generating portion 7 easily penetrates through the first region S1 and the second region S2 formed in the conductive loop L. This makes it possible to easily induce the first inductive noise current I1 and the second inductive noise current I2 flowing in the respective opposite directions through the conductive loop L, thus cancelling the first and second induced currents I1 and I2 with each other to thereby weaken them.

In addition, the first and second ground columns 41 and 42 mounted vertically on the inner surface 48 of the bottom wall 40 of the housing 4 provide a part of the conductive loop L. This reduces the size of the conductive loop L in view of the top side of the housing 4 in the Z direction (see FIG. 2), thus downsizing the power converter 1.

Referring to FIGS. 2 and 3, the capacitor series circuit SC is comprised of the first capacitor 3a, the output terminal 2a, and the second capacitor 3b connected in series via the wires 6. Using the wires 6 increases the area of the inner space of the conductive loop L. This permits the concentric-patterned magnetic flux Φ of the AC magnetic field H to easily pass through the first region S1 and the second region S2 formed in the conductive loop L. This cancels the first and second induced currents I1 and I2 with each other to thereby weaken them.

In addition, in the power converter 1 according to the first embodiment, the magnetic-field generating portion 7, i.e. the output terminal 151 of the diode module 15, the head of the first bolt 5a, and the head of the second bolt 5b are arranged such that the minimum distance r1 between the magnetic-field generating portion 7 and the first bolt 5a in parallel to the inner surface 48 is substantially equal to the minimum distance r2 between the magnetic-field generating portion 7 and the second bolt 5b in parallel to the inner surface 48 (see two-dot chain lines r1 and r2).

This arrangement causes the quantity of the magnetic flux Φ passing through the first region S1, i.e. the number of field lines thereof passing through the first region S1, to be equal to the quantity of the magnetic flux Φ passing through the second region S2, i.e. the number of field lines thereof passing through the second region S2. This results in the magnitude of the first inductive noise current I1 being substantially equal to that of the second inductive noise current I2. Thus, it is possible to substantially zero the quantity of the inductive noise currents entering the output terminal 2a.

Moreover, the power converter 1 according to the first embodiment is configured such that the first and second capacitors 3a and 3b are fixed on the second surface of the printed-circuit board 14. This configuration results in secure mount of the capacitor series circuit SC on the printed-circuit board 14, and in easy electrical connections of the first and second capacitors 3a and 3b to the output terminal 2a and the housing 4.

In the power converter 1 according to the first embodiment, the printed-circuit board 14 is supported on the first and second ground columns 41 and 42 projecting vertically from the inner surface 48 of the bottom wall 40 of the housing 4, and the first and second ground columns 41 and 42 serve as a part of the conductive loop L. Specifically, the first and second ground columns 41 and 42 are shared as the supporting members for supporting the printed-circuit board 14 and as ground electrodes for constituting the conductive loop L. This configuration simplifies the structure of the power converter 1. Using the first and second columns 41 and 42 fixedly supports the printed-circuit board 14 at a distance from the inner surface 48 of the bottom wall 40 of the housing 4. This increases the area of the inner space of the conductive loop L, thus allowing the concentric-patterned magnetic flux Φ of the AC magnetic field H to easily pass through the first region S1 and the second region S2 formed in the conductive loop L.

As described in detail set forth above, the present disclosure provides the power converters 1 each of which prevents large-magnitude noise currents from entering an external terminal thereof.

In the first embodiment, the capacitor series circuit SC is comprised of the first and second capacitors 3a and 3b, but the present disclosure is not limited thereto. Specifically, the capacitor series circuit SC can be configured such that at least one capacitor, an external terminal of the power converter 1, and at least one capacitor are connected in series to each other. Thus, one or more capacitors can be connected in parallel to at least one of the first and second capacitors 3a and 3b. Each of the first and second capacitors 3a and 3b can be comprised of one or more capacitor sells connected in series. The housing 4 is comprised of the bottom wall 40 and the sidewall assembly 49 vertically mounted on the bottom wall 40, but can be comprised of a plate-like housing without having such a sidewall assembly.

Second Embodiment

A power converter 1A according to a second embodiment of the present disclosure will be described hereinafter with reference to FIGS. 10 and 11.

The structure and/or functions of the power converter 1A according to the second embodiment are different from those of the power converter 1 by the following points. So, the different points will be mainly described hereinafter, and therefore, redundant descriptions of like parts between the embodiments, to which like reference characters are assigned, are omitted or simplified.

Figure 10:
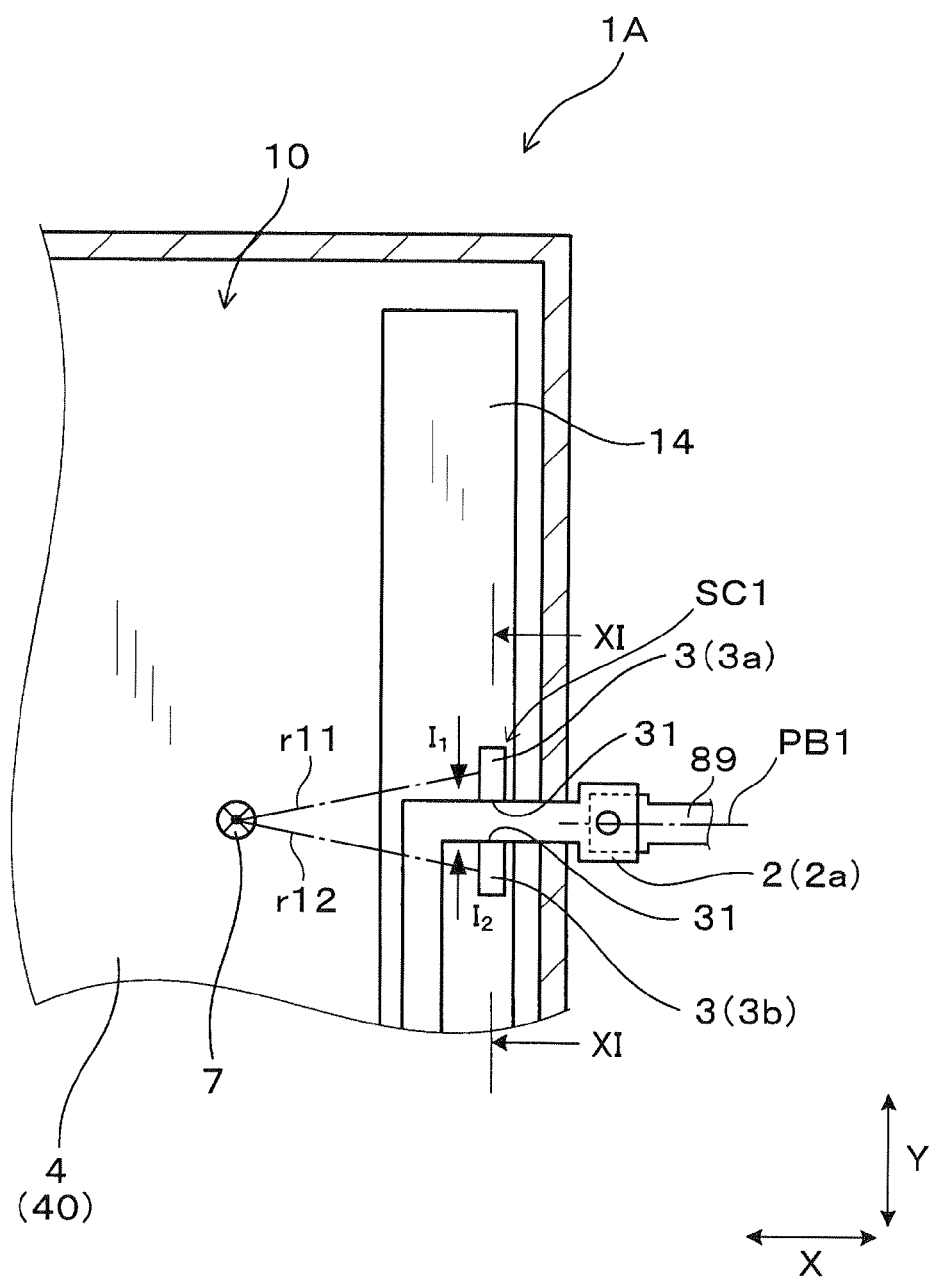
FIG. 10 is an enlarged view of a part of a power converter according to a second embodiment of the present disclosure.
Figure 11:
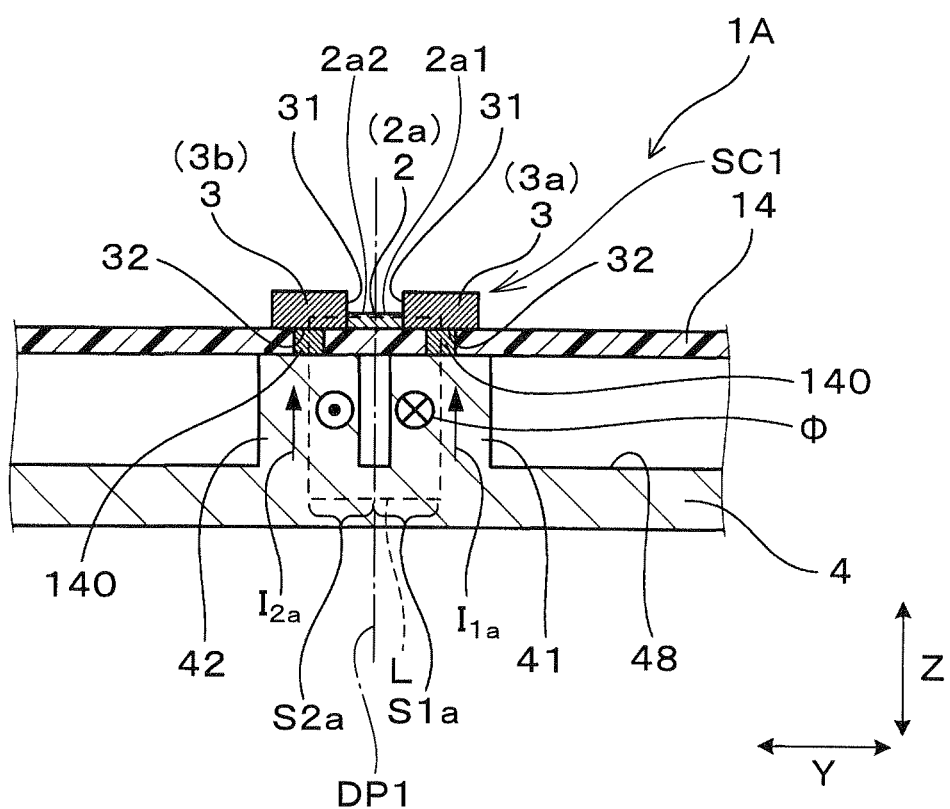
FIG. 11 is a cross sectional view taken on line XI-XI in FIG. 10.

Referring to FIGS. 10 and 11, in the power converter 1A, the first capacitor 3a, the output terminal 2a, and the second capacitor 3b are connected in series between the first ground column 41 and the second ground column 42 without using wires to provide a capacitor series circuit SC1. Specifically, the first electrodes 31 of the respective first and second capacitors 3a and 3b are mounted on the second surface of the printed-circuit board 14, and also directly joined to the output terminal 2a to establish electrical connection therebetween. The first and second capacitors 3a and 3b are mounted on the second surface of the printed-circuit board 14.

Through holes are formed in the Z direction through portions of the printed-circuit board 14 on which the first and second capacitors 3a and 3b are respectively mounted. In the through holes, metal connectors 140 are fitted. In the second embodiment, a lower end of the second electrode 32 of each of the first and second capacitors 3a and 3b extends up to a part of a bottom surface of a corresponding one of the first and second capacitors 3a and 3b. Thus, the end portion of the second electrode 32 of each of the first and second capacitors 3a and 3b, which is located on the bottom of the capacitors 3a and 3b, is mounted on a corresponding one of the metal connectors 140. The metal connectors 140 are mounted on the respective first and second ground columns 41 and 42, so that the first capacitor 3a, the output terminal 2a, and the second capacitor 3b are connected in series between the first ground column 41 and the second ground column 42 to provide the capacitor series circuit SC1. Thus, the capacitor series circuit SC1, the first and second ground columns 41 and 42, and the housing 4 provide the conductive loop L.

In addition, referring to FIG. 10, the magnetic-field generating portion 7, i.e. the output terminal 151 of the diode module 15, the first capacitor 3a, and the second capacitor 3b are arranged such that:

a minimum distance r11 between the magnetic-field generating portion 7 and the center of one major side of the first capacitor 3a in parallel to the inner surface 48, which faces the magnetic-field generating portion 7, is substantially equal to a minimum distance r12 between the magnetic-field generating portion 7 and the center of one major side of the second capacitor 3b in parallel to the inner surface 48 (see two-dot chain lines r11 and r12); the one major side of each of the first and second capacitors 3a and 3b faces the magnetic-field generating portion 7.

Referring to FIG. 11, a first region S1a and a second region S2a are formed in the conductive loop L.

The magnetic flux Φ of an alternating magnetic field H generated by the AC magnetic-field generating portion 7 penetrates in the first region S1a and the second region S2a.

Specifically, when a line connecting between the first electrode 31 of the first capacitor 3a and that of the second capacitor 3b in parallel to the Y direction is defined, on a perpendicular bisector PB1 of the line, the magnetic-field generating portion 7 is located. A phantom plane DP1 is defined to pass through the perpendicular bisector PB1 and is parallel to the X direction, so that the output terminal 2a is divided into a first part 2a1 connected to the first capacitor 3a, and a second part 2a2 connected to the second capacitor 3b.

The first region S1a is formed by the plane DP 1, the first ground column 41, the metal connector 140, the first capacitor 3a, and the first part 2a1 of the output terminal 2a. The second region S2a is formed by the plane DP1, the second ground column 42, the metal connector 140, the second capacitor 3b, and the second part 2a2 of the output terminal 2a.

Specifically, as illustrated in FIG. 11, the concentric-patterned magnetic flux Φ of the AC magnetic field H penetrates, from the near side of the conductive loop L close to the magnetic-field generating portion 7, through the second region S2a of the conductive loop L toward the far side of the conductive loop L far from the magnetic-field generating portion 7 (see the reference character of circled dot). In addition, as illustrated in FIG. 11, the concentric-patterned magnetic flux Φ of the AC magnetic field H penetrates, from the far side of the conductive loop L, through the first region S1a of the conductive loop L toward the near side of the conductive loop L (see the reference character of circled cross, that is, ⊗).

This induces a first inductive noise current I1a flowing through the first ground column 41 of the first area S1a in the Z direction from the ground (housing 4) to the first capacitor 3a, and induces a second inductive noise current I2a flowing through the second ground column 42 of the second area S2a in the Z direction from the ground (housing 4) to the second capacitor 3b.

This results in the first inductive noise current I1a and the second inductive noise current I2a flowing in opposite directions to each other in the conductive loop L.

Other elements of the power converter 1A and other functions thereof are substantially identical to those of the power converter 1.

As described above, the power converter 1A according to the second embodiment is configured to induce the first inductive noise current I1a and the second inductive noise current I2a flowing in the opposite directions to each other in the conductive loop L.

Thus, the power converter 1A is substantially identical in configuration to the power converter 1 except that the first and second capacitors 3a and 3b are directly joined to be electrically connected to the output terminal 2a. Accordingly, the power converter 1A achieves the same technical effects as those achieved by the power converter 1.

Third Embodiment

A power converter 1B according to a third embodiment of the present disclosure will be described hereinafter with reference to FIG. 12.

The structure and/or functions of the power converter 1B according to the third embodiment are different from those of the power converter 1 by the following points. So, the different points will be mainly described hereinafter, and therefore, redundant descriptions of like parts between the embodiments, to which like reference characters are assigned, are omitted or simplified.

Figure 12:
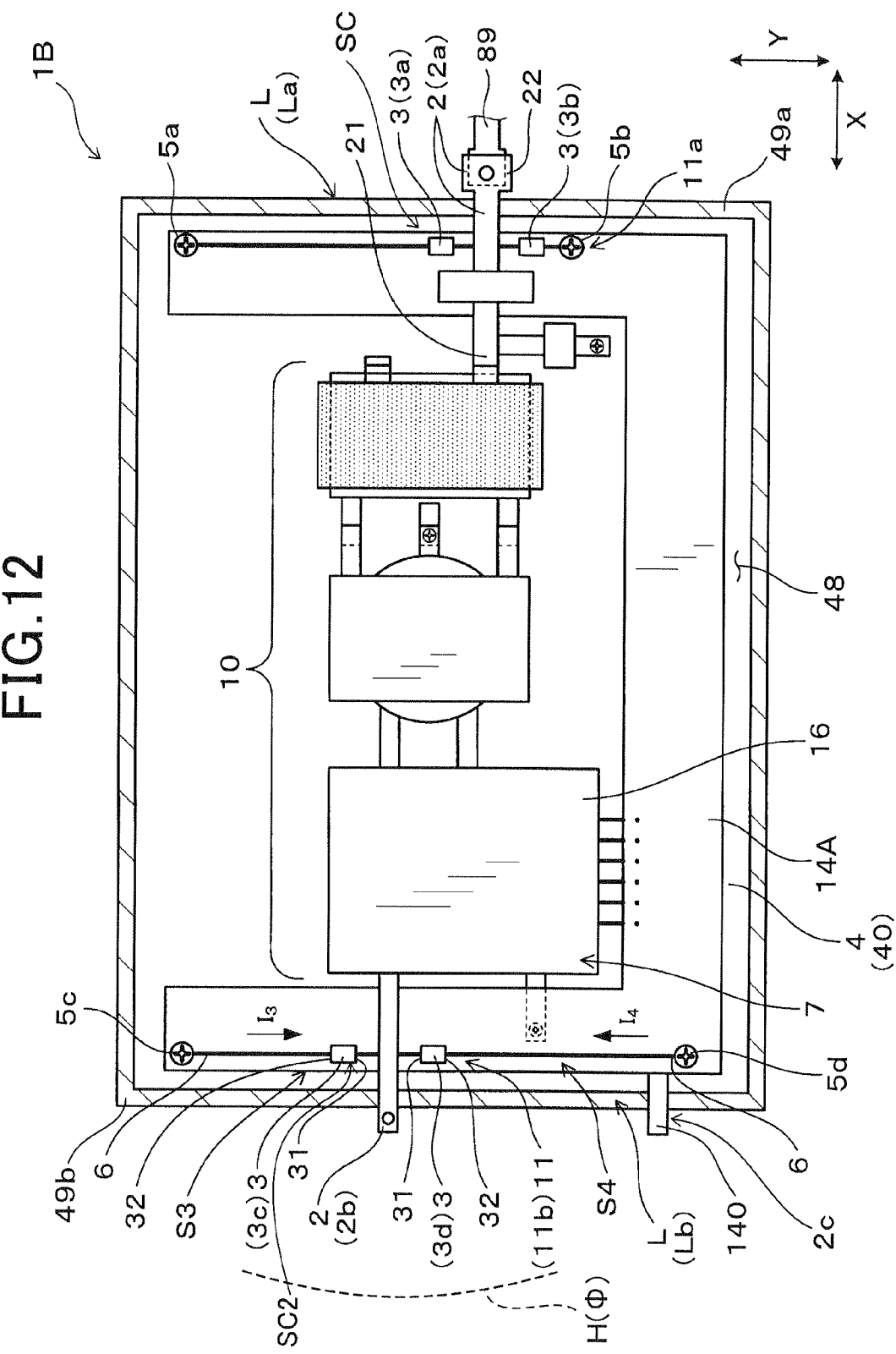
FIG. 12 is a plan view of a power converter according to a third embodiment of the present disclosure.

Referring to FIG. 12, the power converter 1B is comprised of the power converter circuit 10, the external terminals 2 (2a, 2b, and 2c), a first filter circuit 11a, a second filter circuit 11b, and the housing 4. As described in the first embodiment, the first filter circuit 11a is comprised of the first and second capacitors 3a and 3b electrically connected to the external terminal 2a. Like the first embodiment, the first capacitor 3a, the output terminal 2a, and the second capacitor 3b are connected in series between the first ground column 41 and the second ground column 42 via the wires 6 to provide the capacitor series circuit SC. Thus, the capacitor series circuit SC, the first and second ground columns 41 and 42, and the housing 4 provide the conductive loop L; the conductive loop L will be referred to as a first conductive loop La in the third embodiment.

The power converter 1B is also comprised of a third capacitor 3c and a fourth capacitor 3d. In the third embodiment, a printed-circuit board 14A has a substantially C shape in view of the top side of the housing 4. The printed-circuit board 14A is supported at its first short-side portion on the first and second ground columns 41 and 42 projecting vertically from the inner surface 48 of the bottom wall 40 of the housing (ground) 4. The printed-circuit board 14A is also supported at its second short-side portion on third and fourth columns (not shown) projecting vertically from the inner surface 48 of the bottom wall 40 of the housing (ground) 4. The third and fourth ground columns are similar to the first and second ground columns 41 and 42, respectively.

The first and second ground columns 41 and 42 are located close to the first sidewall 49a, so that the first short-side portion of the C-shape printed-circuit board 14A is located close to the first sidewall 49a. Similarly, the third and fourth ground columns are located close to the second sidewall 49b, so that the second short-side portion of the C-shape printed-circuit board 14A is located close to the second sidewall 49b.

Specifically, referring to FIG. 12, the capacitor series circuit SC including the output terminal 2a, the first and second ground columns 41 and 42, and the housing 4 provide the conductive loop L.

Similarly the first electrodes 31 of the respective third and fourth capacitors 3c and 3d are mounted on the second surface of the second short-side portion of the printed-circuit board 14A, and also electrically connected to the input terminal 2b via wires 6 formed as a pattern on the second surface of the printed-circuit board 14A. The second electrodes 32 of the third and fourth capacitors 3c and 3d are electrically connected to the third and fourth ground columns via wires 6 and third and fourth bolts 5c, 5d, respectively. The wires 6 extend linearly in parallel to the Y direction. Specifically, the third capacitor 3c, the input terminal 2b, and the fourth capacitor 3d are connected in series between the third ground column and the fourth ground column via the wires 6 to provide a capacitor series circuit SC2. Thus, the capacitor series circuit SC2, the third and fourth ground columns, and the housing 4 provide a second conductive loop Lb like the first conductive loop La.

The second filter circuit 11b is operative to eliminate transferred noise currents generated in the power converter circuit 10 to thereby prevent the transferred noise currents from entering the input terminal 2b.

In the third embodiment, for example, the MOS module 16 induces an AC magnetic field H having magnetic flux 1 in the form of cylindrical shapes, in other words, concentric patterns in the same manner as the first embodiment (see FIG. 12).

Thus, like the first embodiment, the concentric-patterned magnetic flux Φ of the AC magnetic field H penetrates third and fourth regions S3 and S4 of the second conductive loop Lb. How the second conductive loop Lb is divided into the third and fourth regions S3 and S4 is substantially identical to how the first conductive loop La is divided into the first and second regions S1 and S2 according to the first embodiment. Thus, the descriptions of how the second conductive loop Lb is divided into the third and fourth regions S3 and S4 is omitted.

The concentric-patterned magnetic flux Φ penetrating through the third region S3 induces a third inductive noise current I3 flowing through the capacitor series circuit SC2, and the concentric-patterned magnetic flux Φ penetrating through the fourth region S4 induces a fourth inductive noise current I4 flowing through the capacitor series circuit SC2 opposite in direction to the third inductive noise current I3.

This configuration of the power converter 1B causes the third inductive noise current I3 and the fourth inductive noise current I4 to be cancelled to each other, resulting in the third and fourth inductive noise currents I3 and I4 being weakened. This makes it possible to prevent inductive noise currents with high levels from entering the input terminal 2b.

Other elements of the power converter 1B and other functions thereof are substantially identical to those of the power converter 1.

As described above, the power converter 1B according to the third embodiment is configured to induce the third inductive noise current I3 and the fourth inductive noise current I4 flowing in the opposite directions to each other in the second conductive loop Lb including the input terminal 2b.

Thus, the power converter 1B according to the third embodiment is capable of preventing noise currents induced through each of the first conductive loop La and the second conductive loop Lb from entering a corresponding one of the output terminal 2a and the input terminal 2b. Accordingly, in addition to the same technical effects as those achieved by the power converter 1, the power converter 1B achieves a technical effect of preventing large-magnitude noise currents from externally outputting through both the output and input terminals 2a and 2b of the power converter circuit 10.

Fourth Embodiment

A power converter 1C according to a fourth embodiment of the present disclosure will be described hereinafter with reference to FIG. 13.

The structure and/or functions of the power converter 1C according to the fourth embodiment are different from those of the power converter 1 by the following points. So, the different points will be mainly described hereinafter, and therefore, redundant descriptions of like parts between the embodiments, to which like reference characters are assigned, are omitted or simplified.

Figure 13:
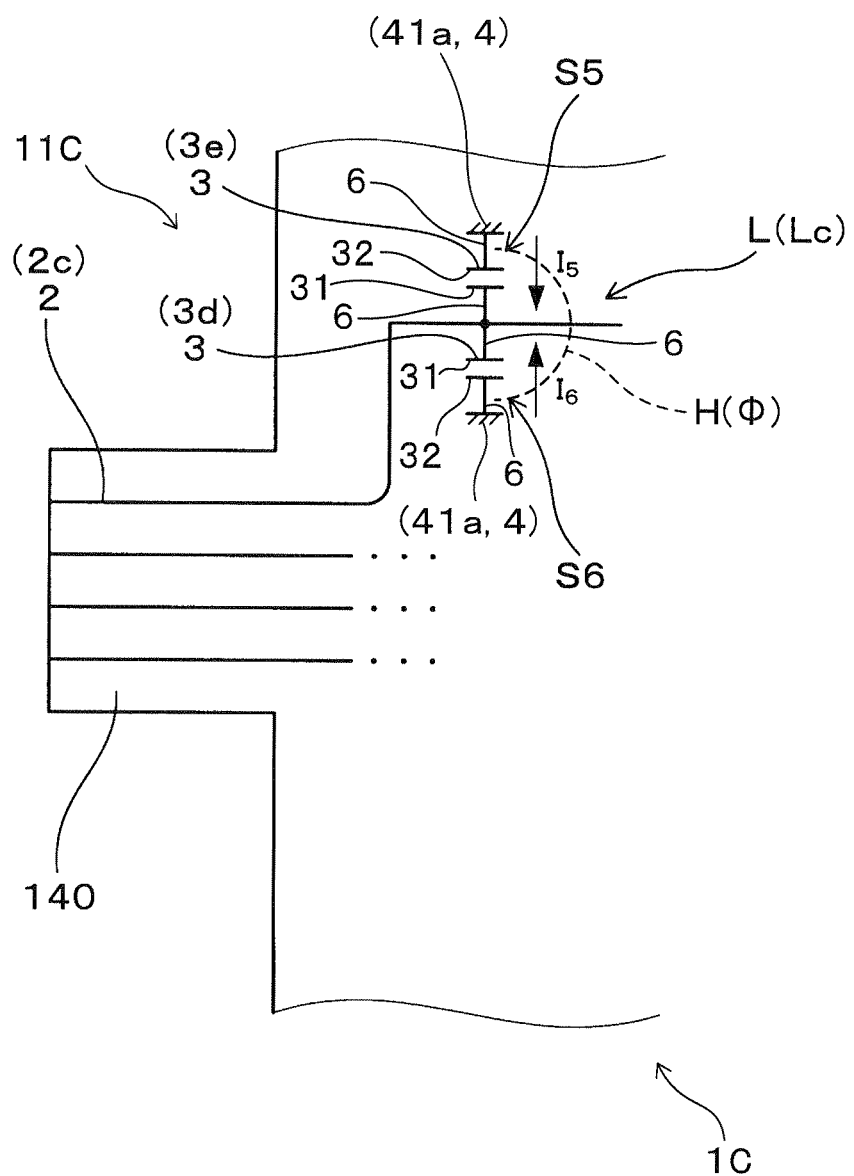
FIG. 13 is a schematic view of a connector including signal terminals of a power converter according to a fourth embodiment of the present disclosure.

Referring to FIG. 13, the power converter 1C is comprised of the power converter circuit 10, the external terminals 2 (2a, 2b, and 2c), a first filter circuit 11a, a third filter circuit 11c, and the housing 4. As described in the first embodiment, the first filter circuit 11a is comprised of the first and second capacitors 3a and 3b electrically connected to the external terminal 2a. Like the first embodiment, the first capacitor 3a, the output terminal 2a, and the second capacitor 3b are connected in series between the first ground column 41 and the second ground column 42 via the wires 6 to provide the capacitor series circuit SC. Thus, the capacitor series circuit SC, the first and second ground columns 41 and 42, and the housing 4 provide the conductive loop L; the conductive loop L will be referred to as a first conductive loop La in the fourth embodiment.

As described above, the connector 140 including the signal terminals 2c penetrates through the second sidewall 49b in parallel to the input terminal 2b (see FIG. 1). To the connector 140, any external devices, such as a host controller, can be communicably connected for inputting various instructions to the printed-circuit board 14 for controlling, for example, on-off operations of the MOSFETs 160a to 160d (see FIG. 9).

The power converter 1C is also comprised of a fifth capacitor 3e and a sixth capacitor 3f. In the fourth embodiment, the first electrodes 31 of the respective fifth and sixth capacitors 3e and 3f are mounted on the second surface of the end portion of the printed-circuit board 14 facing the second sidewall 49b (see FIG. 1), and also electrically connected to one signal terminal (target signal terminal) 2c via wires 6 formed as a pattern on the second surface of the printed-circuit board 14. The second electrodes 32 of the fifth and sixth capacitors 3e and 3f are electrically connected to fifth and sixth ground columns 41a and 42a via wires 6, respectively. Specifically, the fifth capacitor 3e, the target signal terminal 2c, and the sixth capacitor 3f are connected in series between the fifth ground column 41a and the sixth ground column 42a via the wires 6 to provide a capacitor series circuit SC3. Thus, the capacitor series circuit SC3, the fifth and sixth ground columns 41a and 42a, and the housing 4 provide a third conductive loop Lc like the first conductive loop La.

The third filter circuit 11c is operative to eliminate transferred noise currents generated in the power converter circuit 10 to thereby prevent the transferred noise currents from entering the target signal terminal 2c.

In the fourth embodiment, for example, the MOS module 16 induces an AC magnetic field H having magnetic flux Φ in the form of cylindrical shapes, in other words, concentric patterns in the same manner as the second embodiment (see FIG. 12).

Thus, like the first embodiment, the concentric-patterned magnetic flux Φ of the AC magnetic field H penetrates fifth and sixth regions S5 and S6 of the third conductive loop Lc. How the third conductive loop Lc is divided into the fifth and sixth regions S5 and S6 is substantially identical to how the first conductive loop La is divided into the first and second regions S1 and S2 according to the first embodiment. Thus, the descriptions of how the third conductive loop Lc is divided into the fifth and sixth regions S5 and S6 is omitted.

The concentric-patterned magnetic flux Φ penetrating through the fifth region S5 induces a fifth inductive noise current I5 flowing through the capacitor series circuit SC3, and the concentric-patterned magnetic flux Φ penetrating through the sixth region S6 induces a sixth inductive noise current I6 flowing through the capacitor series circuit SC3 opposite in direction to the fifth inductive noise current I5.

This configuration of the power converter 1C causes the fifth inductive noise current I5 and the sixth inductive noise current I6 to cancel each other, resulting in the fifth and sixth inductive noise currents I5 and 16 being weakened. This makes it possible to prevent inductive noise currents with high levels from entering the target signal terminal 2c.

Other elements of the power converter 1C and other functions thereof are substantially identical to those of the power converter 1.

As described above, the power converter 1C according to the fourth embodiment is configured to induce the fifth inductive noise current I5 and the sixth inductive noise current I6 flowing in the opposite directions to each other in the third conductive loop Lc including the target signal terminal 2c.

Thus, the power converter 1C according to the fourth embodiment is capable of preventing noise currents induced through each of the first conductive loop La and the third conductive loop Lc from entering a corresponding one of the output terminal 2a and the target signal terminal 2c. Accordingly, in addition to the same technical effects as those achieved by the power converter 1, the power converter 1C achieves a technical effect of preventing large-magnitude noise currents from externally outputting through both the output input terminal 2a and the target signal terminal 2c of the power converter circuit 10.

Fifth Embodiment

A power converter 1D according to a fifth embodiment of the present disclosure will be described hereinafter with reference to FIG. 14.

The structure and/or functions of the power converter 1D according to the fifth embodiment are different from those of the power converter 1 by the following points. So, the different points will be mainly described hereinafter, and therefore, redundant descriptions of like parts between the embodiments, to which like reference characters are assigned, are omitted or simplified.

A choke coil 12A of the power converter 1D according to the fifth embodiment is designed to be different from the choke coil 12 of the power converter 1 according to the first embodiment. Specifically, referring to FIG. 14, the choke coil 12A is comprised of a core 121 and a winding 120 wound in the core 121. The core 121 is made of a soft-magnetic material. A part 129 of the winding 120 is exposed from the core 121. The exposed part 129 of the winding 120 serves as a magnetic-field generating portion 7a according to the fifth embodiment. That is, the exposed part 129 generates a particularly strong AC magnetic field H, and the concentric-patterned magnetic flux $\Phi$ of the particularly strong AC magnetic field H penetrates through the first section S1 and the second section S2 in the same manner as the first embodiment.

That is, the exposed part 129 of the winding 120 from the core 121 generates the particularly strong AC magnetic field H. However, like the first embodiment, the power converter 1D according to the fifth embodiment is configured such that the concentric-patterned magnetic flux $\Phi$ of the particularly strong AC magnetic field H penetrates through the first section 51 and the second section S2.

This configuration induces the first inductive noise current I1 and the second inductive noise current I2a flowing in the opposite directions to each other in the conductive loop L.

Thus, this configuration causes the first inductive noise current I1 and the second inductive noise current I2 to cancel each other, resulting in the first and second inductive noise currents I1 and I2 being weakened. This makes it possible to prevent inductive noise currents with high levels from entering the output terminal 2a. Accordingly, the power converter 1D achieves the same technical effects as those achieved by the power converter 1.

In a modification of the fifth embodiment, in place of or in addition to the choke coil 12, a transformer 13A can serve as a magnetic-field generating portion 7b. Specifically, the transformer 13A according to this modification is comprised of a core 131 and a winding portion 130 that consists of the primary winding 130a and the secondary winding 130b. The primary winding 130a and the secondary winding 130b are so wound in the core 131 as to be magnetically coupled to each other. A part 135 of the winding portion 130 (130a, 130b) is exposed from the core 131. The exposed part 135 of the winding portion 130 serves as a magnetic-field generating portion 7b according to the fifth embodiment. That is, the exposed part 135 generates a particularly strong AC magnetic field H, and the concentric-patterned magnetic flux $\Phi$ of the particularly strong AC magnetic field H penetrates through the first section S1 and the second section S2 in the same manner as the first embodiment.

That is, the exposed part 135 of the winding portion 130 from the core 131 generates the particularly strong AC magnetic field H. However, like the first embodiment, the power converter 1D according to the fifth embodiment is configured such that the concentric-patterned magnetic flux $\Phi$ of the particularly strong AC magnetic field H penetrates through the first section 51 and the second section S2.

This configuration induces the first inductive noise current I1 and the second inductive noise current I2 flowing in the opposite directions to each other in the conductive loop L.

Thus, this configuration causes the first inductive noise current I1 and the second inductive noise current I2 to be cancelled to each other, resulting in the first and second inductive noise currents I1 and I2 being weakened. This makes it possible to prevent inductive noise currents with high levels from entering the output terminal 2a. Accordingly, the power converter 1D achieves the same technical effects as those achieved by the power converter 1.

Sixth Embodiment

Figure 15A:
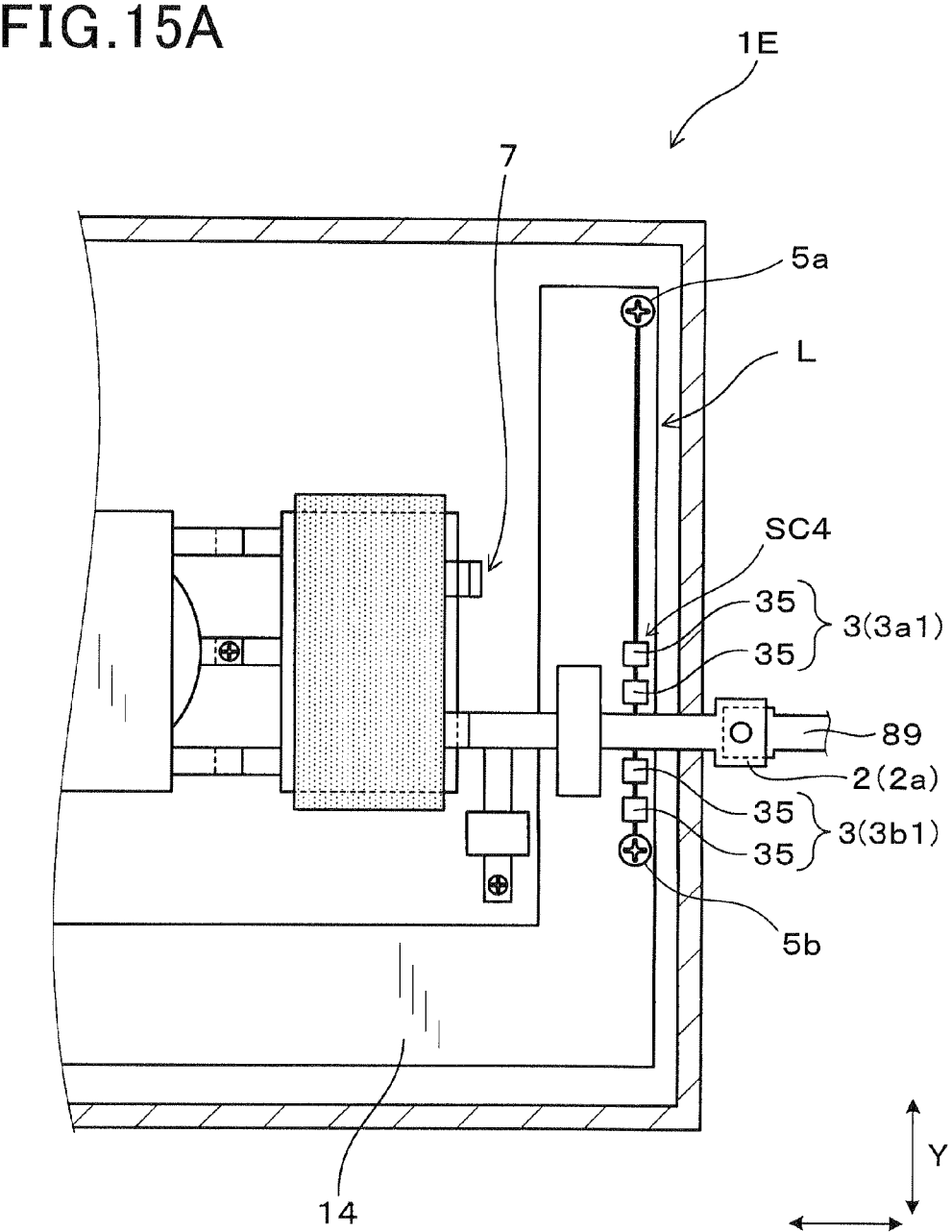
FIG. 15A is a plan view of a power converter according to a sixth embodiment of the present disclosure.

A power converter 1E according to a sixth embodiment of the present disclosure will be described hereinafter with reference to FIG. 15A.

The structure and/or functions of the power converter 1E according to the sixth embodiment are different from those of the power converter 1 by the following points. So, the different points will be mainly described hereinafter, and therefore, redundant descriptions of like parts between the embodiments, to which like reference characters are assigned, are omitted or simplified.

In the sixth embodiment, each of first and second capacitors 3a1 and 3b1 of the power converter 1E is designed to be different in structure from a corresponding one of the first and second capacitors 3a and 3b according to the first embodiment. Specifically, each of the first and second capacitors 3a1 and 3b1 according to the sixth embodiment is comprised of two low-capacitance capacitors 35 connected in series. That is, the series-connected low-capacitance capacitors 35 as the first capacitor 3a1, the output terminal 2a, and the series-connected low-capacitance capacitors 35 as the second capacitor 3b1 are connected in series between the first ground column 41 and the second ground column 42 via the wires 6 to provide a capacitor series circuit SC4. Thus, the capacitor series circuit SC4, the first and second ground columns 41 and 42, and the housing 4 provide the conductive loop L.

Even if there was a short-circuit fault in one of the series-connected low-capacitance capacitors 35, the other of the series-connected low-capacitance capacitors 35 would normally operate, thus improving the failure resistance of the power converter 1E. Three or more low-capacitance capacitors can be connected in series to constitute each of the first and second capacitors 3a and 3b.

Figure 15B:
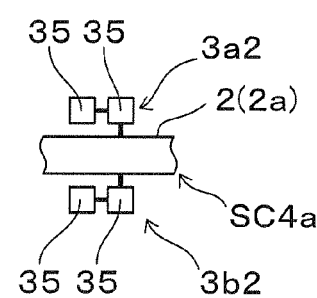
FIG. 15B is a view of a modification of the sixth embodiment.

As a modification, as illustrated in FIG. 15B, each of the first and second capacitors 3a1 and 3b1 is modified such that each of first and second capacitors 3a2 and 3b2 is comprised of two low-capacitance capacitors 35 connected in parallel to each other. In this modification, one of the parallel-connected low-capacitance capacitors 35 as the first capacitor 3a2, the output terminal 2a, and one of the parallel-connected low-capacitance capacitors 35 as the second capacitor 3b2 are connected in series between the first ground column 41 and the second ground column 42 via the wires 6 to provide a capacitor series circuit SC4a.

The configuration of this modification increases the total capacitance of each of the first and second capacitors 3a2 and 3b2 as compared with that of each of the first and second capacitors 3a1 and 3b1, thus reducing the impedance. This results in easy flow of noise currents to the ground.

Seventh Embodiment

Figure 16:
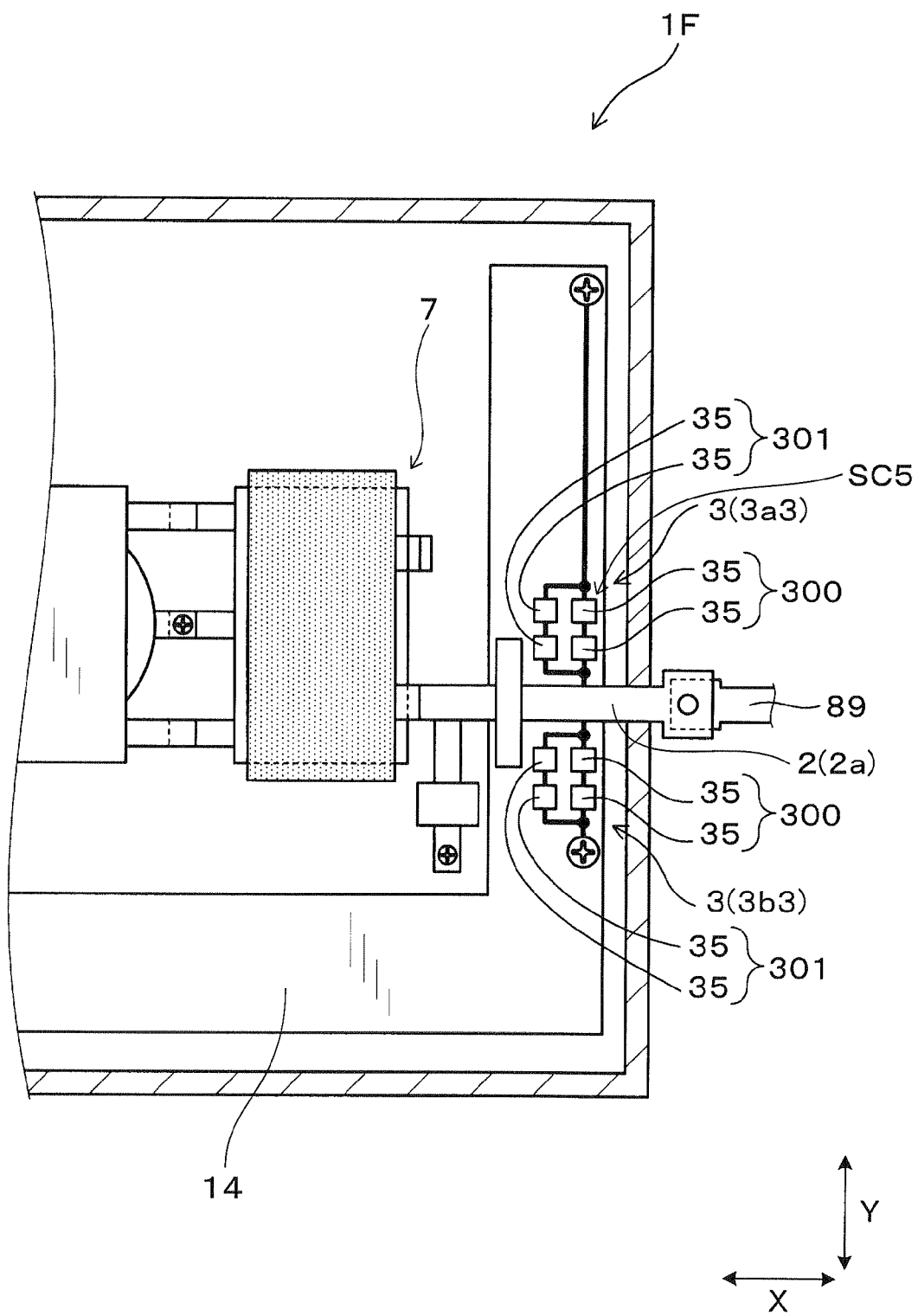
FIG. 16 is a plan view of a power converter according to a seventh embodiment of the present disclosure.

A power converter 1F according to a seventh embodiment of the present disclosure will be described hereinafter with reference to FIG. 16.

The structure and/or functions of the power converter 1F according to the seventh embodiment are different from those of the power converter 1 by the following points. So, the different points will be mainly described hereinafter, and therefore, redundant descriptions of like parts between the embodiments, to which like reference characters are assigned, are omitted or simplified.

In the seventh embodiment, each of first and second capacitors 3a3 and 3b3 of the power converter 1F is designed to be different in structure from a corresponding one of the first and second capacitors 3a and 3b according to the first embodiment. Specifically, each of the first and second capacitors 3a3 and 3b3 according to the seventh embodiment is comprised of a first capacitor module 300 of series-connected low-capacitance capacitors 35 and a second capacitor module 301 of series-connected low-capacitance capacitors 35; the first capacitor module 300 and the second capacitor module 301 are connected in parallel to each other. That is, the number of capacitors of each of the first and second capacitors 3a3 and 3b3 is four.

That is, the first capacitor 3a3, the output terminal 2a, and the second capacitor 3b3 are connected in series between the first ground column 41 and the second ground column 42 via the wires 6 to provide a capacitor series circuit SC5. Thus, the capacitor series circuit SC5, the first and second ground columns 41 and 42, and the housing 4 provide the conductive loop L.

Even if there was a short-circuit fault in one of the series-connected low-capacitance capacitors 35, the other of the series-connected low-capacitance capacitors 35 would normally operate, thus improving the failure resistance of the power converter 1F.

In addition, in the power converter 1F, the total capacitance of each of the first and second capacitors 3a3 and 3b3 is increased as compared with that of each of the first and second capacitors 3a and 3b, thus reducing the impedance. This results in easy flow of noise currents to the ground.

Three or more low-capacitance capacitors can be connected in series to constitute each of the first and second capacitor modules 300 and 301.

Eighth Embodiment

A power converter 1G according to an eighth embodiment of the present disclosure will be described hereinafter with reference to FIG. 17.

The structure and/or functions of the power converter 1G according to the eighth embodiment are different from those of the power converter 1 by the following points. So, the different points will be mainly described hereinafter, and therefore, redundant descriptions of like parts between the embodiments, to which like reference characters are assigned, are omitted or simplified.

In the eighth embodiment, an output terminal 2a3 of the power converter 1G is designed to be different in structure from the output terminal 2a according to the first embodiment.

Figure 17:
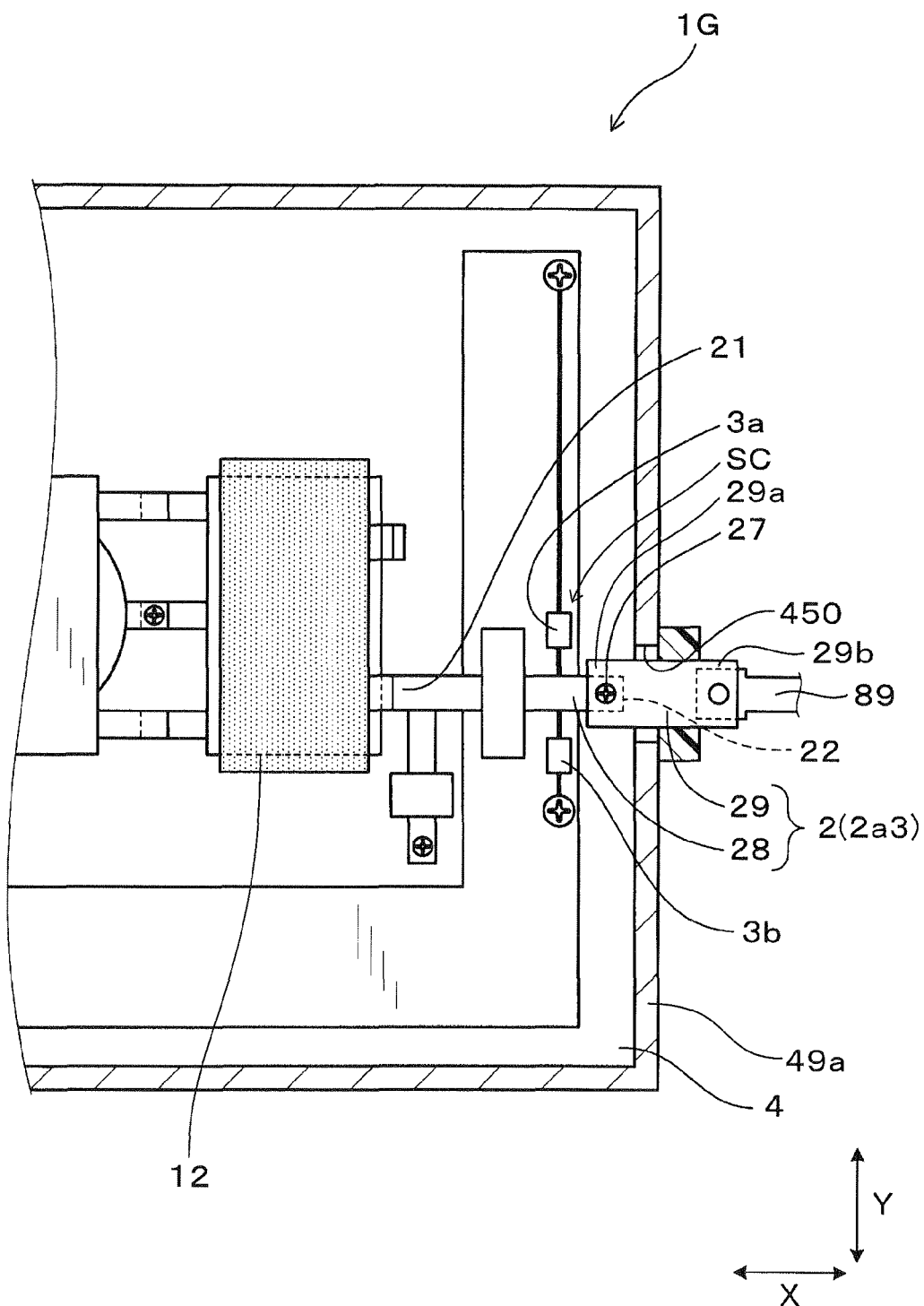
FIG. 17 is a plan view of a power converter according to an eight embodiment of the present disclosure.

Specifically, as illustrated in FIG. 17, the output terminal 2a3 is comprised of a first part 28 and a second part 29. The first part 28 is installed in the housing 4 and connected to the first and second capacitors 3a and 3b in series to provide the capacitor series circuit SC. A through hole 450 is formed through the first sidewall 49a, and the second part 29 is fitted in the through hole 450 while sealing the through hole 450. A first end 22 of the first part 28 is joined to a first end 29a of the second part 29 with a bolt 27. A second end 21 of the first part 28 opposite to the first end 22 is electrically connected to the choke coil 12. To a second end 29b of the second part 29 opposite to the first end 29a, an external connector 89 is electrically and mechanically connected; any external device can be electrically connected to the external connector 89.

Because the output terminal 2a3 is merely different in configuration from the output terminal 2a according to the first embodiment, the power converter 1G achieves the same technical effects as those achieved by the power converter 1 according to the first embodiment.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power converter comprising:
a housing that is grounded;
a power converter circuit having a portion that generates AC magnetic field having a magnetic flux and configured to perform power conversion of input power into output power;
an external terminal electrically connected to the power converter circuit for connection of an external device to the power converter circuit;
a first capacitor having first and second electrodes, the first electrode being connected to the external terminal and the second electrode being connected to the housing; and
a second capacitor having first and second electrodes, the first electrode being connected to the external terminal and the second electrode being connected to the housing,
the first capacitor, the external terminal, the second capacitor, and the housing being arranged to provide a conductive loop having:
a first region through which the magnetic flux of the AC magnetic field penetrates to induce a first noise current flowing through the conductive loop; and
a second region through which the magnetic flux of the AC magnetic field penetrates to induce a second noise current flowing through the conductive loop,
the first noise current flowing through the conductive loop being opposite in direction from the second noise current flowing therethrough, resulting in the first noise current and the second noise current cancelling each other out.

2. The power converter according to claim 1, wherein the external terminal has a first end to which the external device is connectable and a second end connected to the power converter circuit, and the conductive loop is located closer to the first end than to the second end.

3. The power converter according to claim 1, wherein the external terminal is an output terminal of the power converter circuit for outputting the output power, and the first and second capacitors serve as a filter circuit that removes noise currents due to the power conversion from the output power being output through the output terminal.

4. The power converter according to claim 1, wherein the power converter circuit is mounted on a base surface of the housing to be installed therein, the portion of the power converter circuit that generates the AC magnetic field has an alternating-current path arranged in a normal direction of the base surface of the housing, so that an alternating current flows through the alternating-current path, the alternating current serving as a source that generates the AC magnetic field, the power converter further comprises:
   a pair of first and second conductive columns projecting from the base surface of the housing in the normal direction and configured to support the external terminal connected to the first capacitor and the second capacitor, the pair of first and second conductive columns constituting a part of the conductive loop.

5. The power converter according to claim 4, further comprising:
   wires connecting between: the first conductive column and the first capacitor; the first capacitor and the external terminal; the external terminal and the second capacitor; and the second capacitor and the second conductive column, respectively.

6. The power converter according to claim 1, wherein the power converter circuit comprises a choke coil, the choke coil comprising a core and a winding wound in the core, a part of the winding being exposed from the core, the exposed part of the winding serving as the portion of the power converter circuit that generates the AC magnetic field.

7. The power converter according to claim 1, wherein the power converter circuit comprises a transformer, the transformer comprising a core, a winding portion wound in the core, a part of the winding portion being exposed from the core, the exposed part of the winding serving as the portion of the power converter circuit that generates the AC magnetic field.

8. The power converter according to claim 1, wherein each of the first and second capacitors is designed as a set of a plurality of capacitors electrically connected to each other.

9. The power converter according to claim 1, wherein the portion of the power converter circuit generates the AC magnetic field having concentric-patterned magnetic flux as the magnetic flux around the portion of the power converter circuit, and the first region and the second region of the conductive loop are arranged to face the portion of the power converter circuit while a first flux part of the concentric-patterned magnetic flux penetrates through the first region of the conductive loop and a second flux part thereof penetrates through the second region of the conductive loop to induce the first noise current and the second noise current flowing through the conductive loop in the opposite directions to each other.

10. A power converter comprising:
   a housing that is grounded;
   a power converter circuit installed in the housing and configured to perform power conversion of input power into output power;
   an external terminal electrically connected to the power converter circuit for connection of an external device to the power converter circuit;
   a first capacitor having first and second electrodes, the first electrode being connected to the external terminal and the second electrode being connected to the housing; and
   a second capacitor having first and second electrodes, the first electrode being connected to the external terminal and the second electrode being connected to the housing such that the external terminal is sandwiched between the first capacitor and the second capacitor, the first capacitor, the external terminal, the second capacitor, and the housing being arranged to provide a conductive loop,
   wherein the power converter circuit is mounted on a base surface of the housing to be installed therein, the power converter circuit having a portion that generates AC magnetic field having a magnetic flux, the portion of the power converter circuit that generates the AC magnetic field having an alternating-current path arranged in a normal direction of the base surface of the housing, so that an alternating current flows through the alternating-current path, the alternating current serving as a source that generates the AC magnetic field, the power converter further comprises:
   a pair of first and second conductive columns projecting from the base surface of the housing in the normal direction and configured to support the external terminal connected to the first capacitor and the second capacitor, the pair of first and second conductive columns constituting a part of the conductive loop.

11. The power converter according to claim 10, wherein the external terminal has a first end to which the external device is connectable and a second end connected to the power converter circuit, and the conductive loop is located closer to the first end than to the second end.

12. The power converter according to claim 10, wherein the external terminal is an output terminal of the power converter circuit for outputting the output power, and the first and second capacitors serve as a filter circuit that removes noise currents due to the power conversion from the output power being output through the output terminal.

13. The power converter according to claim 10, further comprising:
   wires connecting between: the first conductive column and the first capacitor; the first capacitor and the external terminal; the external terminal and the second capacitor; and the second capacitor and the second conductive column, respectively.

14. The power converter according to claim 10, the power converter circuit comprises a choke coil, the choke coil comprising a core and a winding wound in the core, a part of the winding being exposed from the core, the exposed part of the winding generating the AC magnetic field having the magnetic flux, an inside region of the conductive loop being divided into a first region through which a first flux part of the magnetic flux penetrates and a second region through which a second flux part of the magnetic flux penetrates.

15. The power converter according to claim 10, wherein the power converter comprises a transformer, the transformer comprising a core, a winding portion wound in the core, a part of the winding portion being exposed from the core, the exposed part of the winding generating the AC magnetic field having the magnetic flux, an inside region of the conductive loop being divided into a first region through which a first flux part of the magnetic flux penetrates and a second region through which a second flux part of the magnetic flux penetrates.

16. The power converter according to claim 10, wherein each of the first and second capacitors is designed as a set of a plurality of capacitors electrically connected to each other.

17. The power converter according to claim 10, wherein the power converter circuit comprises a portion that generates the AC magnetic field having concentric-patterned magnetic flux around the portion of the power converter circuit, the conductive loop has a first region and a second region formed therein, the first region and the second region of the conductive loop are arranged to cross therethrough the concentric-patterned magnetic flux.

18. The power converter according to claim 17, wherein the first region and the second region of the conductive loop are arranged to face the portion of the power converter circuit such that a first flux part of the concentric-patterned magnetic flux penetrates:
through the first region of the conductive loop in one of a first direction away from the portion of the power converter circuit and a second direction close to the portion of the power converter circuit; and
through the second region of the conductive loop in the other of the first direction and the second direction.

* * * * *